United States Patent
Tatsushima et al.

(10) Patent No.: US 12,305,806 B2
(45) Date of Patent: May 20, 2025

(54) HIGH-PRESSURE VESSEL AND METHOD FOR MANUFACTURING SAME

(71) Applicant: HONDA MOTOR CO., LTD., Tokyo (JP)

(72) Inventors: Kosuke Tatsushima, Wako (JP); Koei Fujiki, Wako (JP); Yusuke Tsuchiyama, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 17/843,543

(22) Filed: Jun. 17, 2022

(65) Prior Publication Data
US 2022/0412510 A1 Dec. 29, 2022

(30) Foreign Application Priority Data
Jun. 24, 2021 (JP) .................. 2021-104661

(51) Int. Cl.
*F17C 1/06* (2006.01)
(52) U.S. Cl.
CPC ........ *F17C 1/06* (2013.01); *F17C 2201/0109* (2013.01); *F17C 2203/0604* (2013.01); *F17C 2203/0621* (2013.01)
(58) Field of Classification Search
CPC ............... F17C 1/06; F17C 2201/0109; F17C 2203/0604; F17C 2203/0621; F17C 2205/0305
(Continued)

(56) References Cited

U.S. PATENT DOCUMENTS

| 6,230,922 B1* | 5/2001 | Rasche | F17C 1/16 220/586 |
| 2012/0241461 A1* | 9/2012 | Cola | F17C 1/16 220/582 |

(Continued)

FOREIGN PATENT DOCUMENTS

| CN | 110662918 A | 1/2020 |
| CN | 113108235 A | 7/2021 |

(Continued)

OTHER PUBLICATIONS

Office Action dated Apr. 9, 2024 issued in the corresponding Japanese Patent Application 2021-104661 with the English machine translation thereof.

(Continued)

*Primary Examiner* — Don M Anderson
*Assistant Examiner* — Laura E. Parker
(74) *Attorney, Agent, or Firm* — Carrier, Shende & Associates P.C.; Fulchand P. Shende; Joseph P. Carrier

(57) ABSTRACT

A high-pressure vessel includes a liner and a reinforcing layer. The reinforcing layer includes an inner reinforcing layer and an outer reinforcing layer. Further, the inner reinforcing layer includes a first covering portion, a third covering portion, and a second covering portion. Edge surfaces of the first covering portion and the third covering portion that face each other are in contact with each other. Edge surfaces of the third covering portion and the second covering portion that face each other are also in contact with each other. The outer reinforcing layer covers the outside of the first covering portion, the third covering portion, and the second covering portion.

4 Claims, 16 Drawing Sheets

(58) Field of Classification Search
USPC .................................................. 220/589, 581
See application file for complete search history.

(56) References Cited

U.S. PATENT DOCUMENTS

| | | | | |
|---|---|---|---|---|
| 2013/0299504 | A1* | 11/2013 | Koppert | F17C 1/16 |
| | | | | 220/586 |
| 2020/0240586 | A1 | 7/2020 | Sonnen et al. | |
| 2021/0197499 | A1* | 7/2021 | Katano | F17C 1/02 |
| 2021/0213689 | A1* | 7/2021 | Maeda | B29C 70/32 |
| 2021/0221081 | A1* | 7/2021 | Katano | F17C 1/06 |
| 2021/0293380 | A1 | 9/2021 | Fujii et al. | |
| 2022/0010928 | A1* | 1/2022 | Katano | B29C 53/602 |
| 2022/0032559 | A1* | 2/2022 | Takeda | B29C 69/002 |

FOREIGN PATENT DOCUMENTS

| | | |
|---|---|---|
| JP | 2010-236614 A | 10/2010 |
| JP | 2016-176599 A | 10/2016 |
| JP | 2017-140809 A | 8/2017 |
| JP | 2018-083391 A | 5/2018 |
| JP | 2021-146725 A | 9/2021 |

OTHER PUBLICATIONS

Office Action dated Jan. 25, 2025 issued in the corresponding Chinese Patent Application No. 202210724696.7 with the English machine translation thereof.

\* cited by examiner

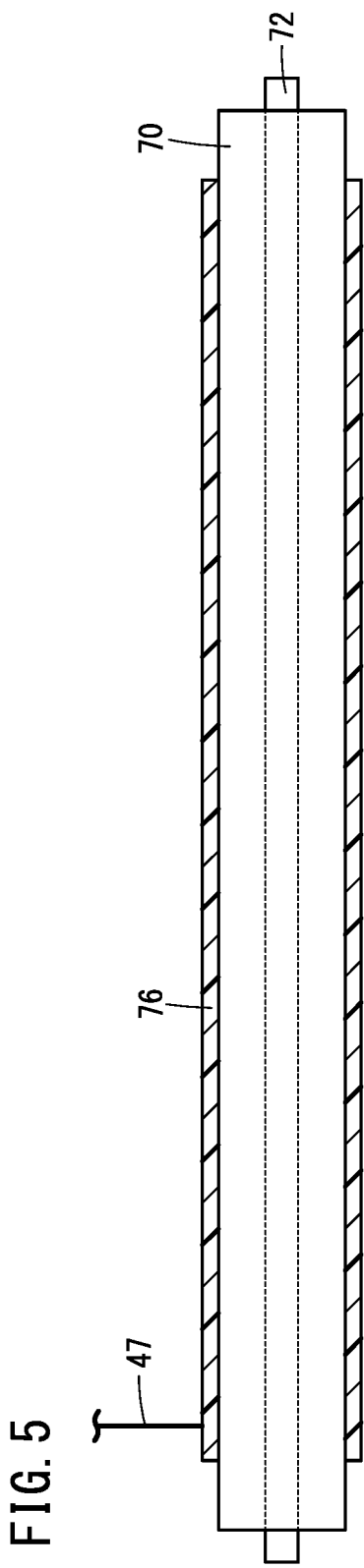

HIGH-PRESSURE VESSEL AND METHOD FOR MANUFACTURING SAME

CROSS-REFERENCE TO RELATED APPLICATIONS

This application is based upon and claims the benefit of priority from Japanese Patent Application No. 2021-104661 filed on Jun. 24, 2021, the contents of which are incorporated herein by reference.

BACKGROUND OF THE INVENTION

Field of the Invention

The present invention relates to a high-pressure vessel including a hollow liner and a reinforcing layer covering the liner from the outside, and a method for manufacturing the high-pressure vessel.

Description of the Related Art

A high-pressure vessel stores, for example, hydrogen gas or the like to be supplied to a fuel cell. Since the gas is stored at high pressure, high strength is required for the high-pressure vessel. Therefore, the high-pressure vessel includes a liner and a reinforcing layer covering the liner from the outside. Since the reinforcing layer suppresses expansion of the liner, the entire high-pressure vessel has high strength.

Here, the high-pressure vessel is required to be lightweight. Therefore, in many cases, fiber-reinforced resin is selected as the material of the reinforcing layer. Further, resin is often selected as the material of the liner.

The high-pressure vessel having the above structure is manufactured as follows. First, a liner is produced. Specifically, for example, a plurality of divided pieces are obtained by performing injection molding using a melted resin. Thereafter, the liner is obtained by joining the divided pieces to each other. Alternatively, the liner can be obtained by blow molding as described in JP 2018-083391 A. In this case, gas is supplied to a hollow preform inserted into the mold. As a result, the preform expands.

Next, as described in JP 2018-083391 A, reinforcing fiber impregnated with resin is wound around the outer wall of the liner by a filament winding method or the like. As the resin is cured, a reinforcing layer is formed. Further, J P 2017-140809 A proposes the following method. First, a sheet body is wound around a cylindrical body portion of the liner by a sheet winding method. Thereafter, a thread body is wound by a filament winding method to form a reinforcing layer. The sheet body and the thread body are reinforcing fibers impregnated with resin.

SUMMARY OF THE INVENTION

Incidentally, with the same mold, only liners of the same shape and dimensions can be obtained. Therefore, when high-pressure vessels having different shapes or dimensions are produced, it is necessary to prepare molds with cavities having different shapes or dimensions. In this case, however, equipment investment is increased. Further, a space for storing a large number of molds is required.

An object of the present invention is to solve the aforementioned problem.

According to an aspect of the present invention, provided is a high-pressure vessel comprising a liner that is hollow, and a reinforcing layer configured to cover the liner from outside, wherein the liner includes a body portion having a tubular shape, and a first dome portion and a second dome portion respectively connected to longitudinal both end portions of the body portion, the reinforcing layer includes an inner reinforcing layer made of a fiber-reinforced resin and configured to cover the liner from outside, and an outer reinforcing layer made of the fiber-reinforced resin and configured to cover the inner reinforcing layer from outside, the inner reinforcing layer includes a first covering portion configured to cover the first dome portion, a second covering portion configured to cover the second dome portion, and a third covering portion configured to cover the body portion, a first edge surface of the first covering portion that faces the third covering portion and a second edge surface of the third covering portion that faces the first covering portion are brought into contact with each other, and a third edge surface of the third covering portion that faces the second covering portion and a fourth edge surface of the second covering portion that faces the third covering portion are brought into contact with each other, and the outer reinforcing layer covers the first covering portion, the third covering portion, and the second covering portion from outside.

Further, according to another aspect of the present invention, provided is a method for manufacturing a high-pressure vessel including a liner that is hollow, and a reinforcing layer configured to cover the liner from outside, the method comprising: molding a tubular body made of a fiber-reinforced resin by winding resin-impregnated reinforcing fiber around a first mold; simultaneously molding a first covering portion and a second covering portion each made of the fiber-reinforced resin by winding the resin-impregnated reinforcing fiber around a second mold; temporarily assembling an inner reinforcing layer by using a part or whole of the tubular body as a third covering portion, the inner reinforcing layer including the first covering portion, the third covering portion, and the second covering portion, and by bringing a first edge surface of the first covering portion that faces the third covering portion into contact with a second edge surface of the third covering portion that faces the first covering portion, and bringing a third edge surface of the third covering portion that faces the second covering portion into contact with a fourth edge surface of the second covering portion that faces the third covering portion; winding the resin-impregnated reinforcing fiber around the inner reinforcing layer to obtain an outer reinforcing layer configured to cover the inner reinforcing layer from outside, thereby obtaining a reinforcing layer including the inner reinforcing layer and the outer reinforcing layer; inserting a hollow preform into an inner side of the inner reinforcing layer through a first opening formed in the first covering portion or the second covering portion, and a second opening formed in the outer reinforcing layer and overlapping the first opening; and supplying a gas into the hollow preform to expand the hollow preform and then curing the expanded hollow preform to obtain the liner including a first dome portion, a body portion, and a second dome portion, wherein an outer side of the first dome portion is covered with the first covering portion, an outer side of the body portion is covered with the third covering portion, and an outer side of the second dome portion is covered with the second covering portion.

In the present invention, the reinforcing layer includes the inner reinforcing layer and the outer reinforcing layer. The inner reinforcing layer includes the first covering portion, the second covering portion, and the third covering portion. A reinforcing layer having a desired length can be obtained by producing the third covering portion with an appropriate length and providing the outer reinforcing layer on the outer side of the inner reinforcing layer. Thereafter, the hollow preform having a length corresponding to the length of the reinforcing layer is expanded on the inner side of the reinforcing layer. In this way, a high-pressure vessel having a desired length can be obtained.

Therefore, it is not necessary to prepare molds of various shapes or dimensions. As a result, it is possible to reduce equipment investment. Further, a space for storing a large number of molds is not required. Therefore, it is also possible to achieve space saving of a manufacturing station of the high-pressure vessel.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a schematic side view showing a state in which a tubular body is produced using a tubular mandrel;

DESCRIPTION OF THE INVENTION

Hereinafter, an inclined surface that gradually decreases or increases in diameter is defined as a "tapered inclined surface".

Figure 1:
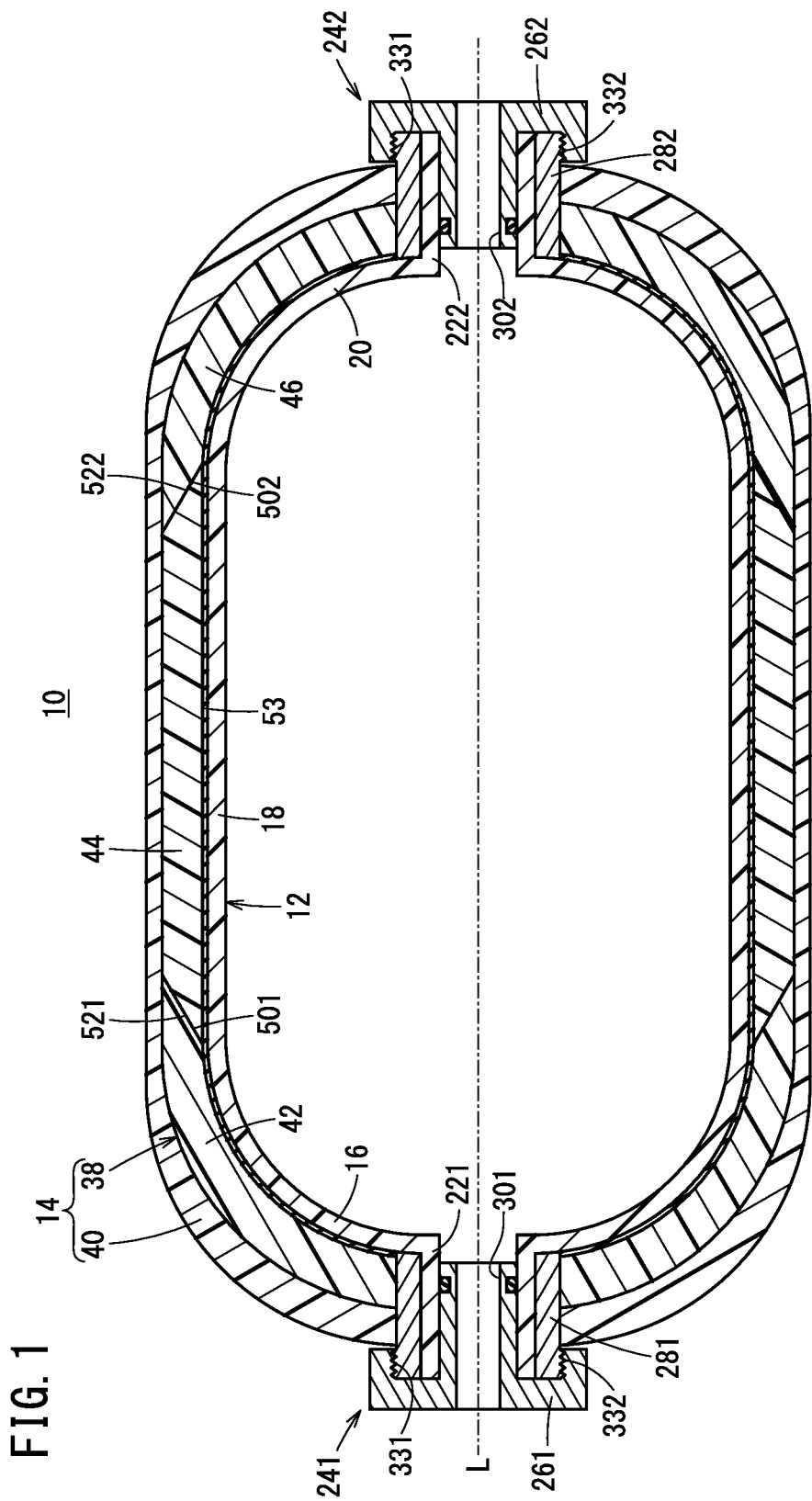
FIG. 1 is a schematic side cross-sectional view along the longitudinal direction of a high-pressure vessel according to an embodiment of the present invention.

FIG. 1 is a schematic side cross-sectional view along the longitudinal direction of a high-pressure vessel 10 according to the present embodiment. The high-pressure vessel 10 includes a liner 12 as an inner layer, and a reinforcing layer 14 as an outer layer.

The liner 12 is made of a resin such as polyethylene, polypropylene, polyamide, or polycarbonate. Alternatively, the liner 12 is made of a metal such as stainless steel. The liner 12 includes a first dome portion 16, a body portion 18, and a second dome portion 20. The body portion 18 is sandwiched between the first dome portion 16 and the second dome portion 20.

The first dome portion 16 has a cup shape whose diameter decreases in a direction away from the body portion 18. A first tubular portion 221 protrudes from a radially central portion of the first dome portion 16. The first tubular portion 221 extends in a direction away from the body portion 18. As shown in detail in FIG. 2, the first tubular portion 221 is provided with a first cap 241. The first cap 241 includes a first inner cap 261 and a first outer cap 281. The first tubular portion 221 is sandwiched between the first inner cap 261 and the first outer cap 281.

A main body 291 of the first inner cap 261 is inserted into the hollow interior of the first tubular portion 221. A first passage 301 extending along the longitudinal direction of the first tubular portion 221 is formed in the main body 291. Further, a cap portion 321 is provided at a distal end of the first inner cap 261. A female thread 331 is formed on an inner peripheral wall of the cap portion 321. On the other hand, a male thread 332 is formed at a distal end of the first outer cap 281. The distal end of the first outer cap 281 enters the interior of the cap portion 321. Further, the male thread 332 is screwed into the female thread 331.

The diameter of the body portion 18 (see FIG. 1) is substantially constant along the longitudinal direction of the body portion 18. Therefore, the body portion 18 has a slightly elongated tubular shape.

The second dome portion 20 is congruent with the first dome portion 16. The second dome portion 20 is reduced in diameter in a direction away from the body portion 18, thereby having a cup shape. A second tubular portion 222 protrudes from a radially central portion of the second dome portion 20. The second tubular portion 222 extends in a direction away from the body portion 18. Therefore, the first tubular portion 221 and the second tubular portion 222 are oriented in opposite directions. The first tubular portion 221 and the second tubular portion 222 are located on a single imaginary central axis L. The imaginary central axis L passes through the radial center of the first dome portion 16 and the radial center of the second dome portion 20, and extends along the longitudinal direction of the liner 12. Hereinafter, the direction along the imaginary central axis L is referred to as an "axial direction of the high-pressure vessel 10".

Figure 3:
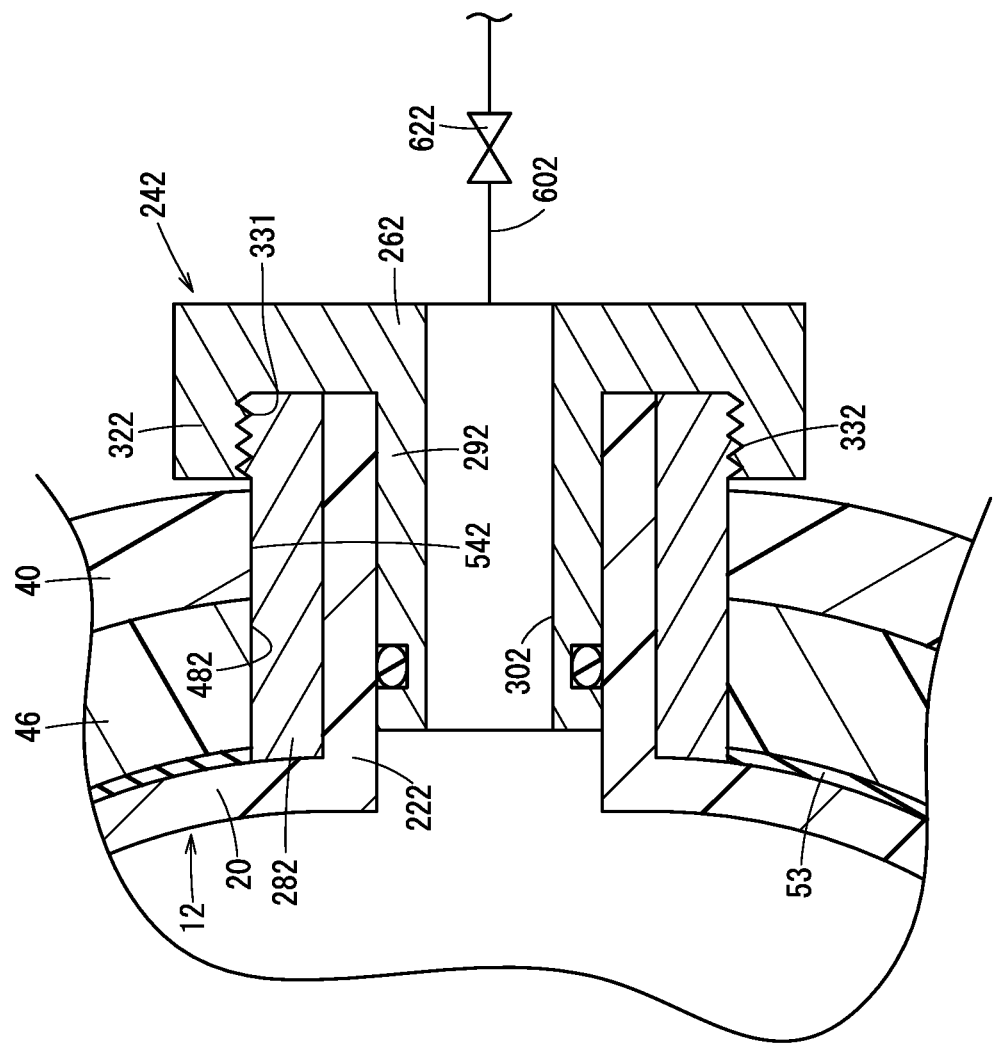
FIG. 3 is an enlarged view of a main part of a second dome portion and a vicinity of the second dome portion.

As shown in detail in FIG. 3, the second tubular portion 222 is provided with a second cap 242. The second cap 242 includes a second inner cap 262 and a second outer cap 282. The second tubular portion 222 is sandwiched between the second inner cap 262 and the second outer cap 282.

A main body 292 of the second inner cap 262 is inserted into the hollow interior of the second tubular portion 222. A second passage 302 extending along the longitudinal direction of the second tubular portion 222 is formed in the main body 292. Further, a cap portion 322 is provided at a distal end of the second inner cap 262. A female thread 331 is formed on an inner peripheral wall of the cap portion 322. On the other hand, a male thread 332 is formed at a distal end of the second outer cap 282. The distal end of the second outer cap 282 enters the interior of the cap portion 322. Further, the male thread 332 is screwed into the female thread 331.

As shown in FIG. 1, the reinforcing layer 14 includes an inner reinforcing layer 38 covering the liner 12 from the outside, and an outer reinforcing layer 40 covering the inner reinforcing layer 38 from the outside. The inner reinforcing layer 38 and the outer reinforcing layer 40 are made of a fiber reinforced resin (FRP) in which reinforcing fibers are impregnated with a resin base material. That is, each of the inner reinforcing layer 38 and the outer reinforcing layer 40 is formed by winding impregnated fiber 47 shown in FIG. 5 and the like a plurality of times. The impregnated fiber 47 is reinforcing fiber impregnated with a resin. Examples of the reinforcing fiber include long fibers or short fibers of carbon fibers or glass fibers. In the inner reinforcing layer 38 and the outer reinforcing layer 40, the resin is cured.

The inner reinforcing layer 38 includes a first covering portion 42, a third covering portion 44, and a second covering portion 46. The first covering portion 42 covers the first dome portion 16 from the outside. The third covering portion 44 covers the body portion 18 from the outside. The second covering portion 46 covers the second dome portion 20 from the outside. The first covering portion 42, the third covering portion 44, and the second covering portion 46 are linearly arranged in parallel.

The first covering portion 42 is formed by low-angle helical winding of the impregnated fiber 47 (see FIG. 5). Similarly, the second covering portion 46 is formed by low-angle helical winding of the impregnated fiber 47. That is, the first covering portion 42 and the second covering portion 46 are low-angle helical layers. In contrast, the third covering portion 44 is formed by hoop winding of the impregnated fiber 47. That is, the third covering portion 44 is a hoop layer. The third covering portion 44 may be a mixed layer of hoop layers and low-angle helical layers.

A first insertion hole 481 (see FIG. 2) is formed in a radially central portion of the first covering portion 42. Further, an end portion of the first covering portion 42 that faces the third covering portion 44 is an open end. The open end has a first edge surface 501. An inner peripheral edge of the first edge surface 501 is adjacent to the first dome portion 16, and an outer peripheral edge of the first edge surface 501 is adjacent to the body portion 18. That is, the first edge surface 501 is a tapered inclined surface in which the amount of protrusion toward the body portion 18 increases from the inner periphery toward the outer periphery.

Both ends of the third covering portion 44 are open ends. The open end of the third covering portion 44 that faces the first edge surface 501 of the first covering portion 42 has a second edge surface 521. An inner peripheral edge of the second edge surface 521 is adjacent to the first dome portion 16, and an outer peripheral edge of the second edge surface 521 is adjacent to the body portion 18. That is, the second edge surface 521 is a tapered inclined surface in which the amount of protrusion toward the first dome portion 16 decreases from the inner periphery toward the outer periphery. The inclination directions of the first edge surface 501 and the second edge surface 521 are opposite to each other. The first edge surface 501 and the second edge surface 521 are brought into contact with each other.

Further, the open end of the third covering portion 44 that faces the second covering portion 46 has a third edge surface 522. An inner peripheral edge of the third edge surface 522 is adjacent to the second dome portion 20, and an outer peripheral edge of the third edge surface 522 is adjacent to the body portion 18. That is, the third edge surface 522 is a tapered inclined surface in which the amount of protrusion toward the second dome portion 20 decreases from the inner periphery toward the outer periphery.

The second covering portion 46 is congruent with the first covering portion 42. However, in the axial direction of the high-pressure vessel 10, the first covering portion 42 and the second covering portion 46 are oriented in opposite directions. A second insertion hole 482 (see FIG. 3) is formed in a radially central portion of the second covering portion 46.

An end portion of the second covering portion 46 that faces the third covering portion 44 is an open end. The open end has a fourth edge surface 502. An inner peripheral edge of the fourth edge surface 502 is adjacent to the second dome portion 20, and an outer peripheral edge of the fourth edge surface 502 is adjacent to the body portion 18. That is, the fourth edge surface 502 is a tapered inclined surface in which the amount of protrusion toward the body portion 18 increases from the inner periphery toward the outer periphery. The inclination directions of the third edge surface 522 and the fourth edge surface 502 are opposite to each other. The third edge surface 522 and the fourth edge surface 502 are brought into contact with each other.

A lubricating layer 53 is formed on an inner wall of the inner reinforcing layer 38 (the first covering portion 42, the third covering portion 44, and the second covering portion 46) that faces the liner 12. The lubricating layer 53 is formed by applying a lubricant 102 (see FIG. 13) described later. The lubricating layer 53 prevents the outer coating wall of the liner 12 from adhering to the inner wall of the inner reinforcing layer 38. A preferable specific example of the lubricant 102 includes a release agent used in injection molding or the like. A typical example of the release agent is a silicone-based compound.

The outer reinforcing layer 40 covers the entire inner reinforcing layer 38 from the outside. The outer reinforcing layer 40 is mainly formed by high-angle helical winding of the impregnated fiber 47. However, the portions of the outer reinforcing layer 40 that cover the first covering portion 42 and the second covering portion 46 may be formed by low-angle helical winding. In this case, the outer reinforcing layer 40 is a mixed layer of high-angle helical layers and low-angle helical layers. Alternatively, the outer reinforcing layer 40 may be a single high-angle helical layer. In this case, the outer reinforcing layer 40 is not laminated in the vicinity of the radial center of the first covering portion 42.

Similarly, the outer reinforcing layer 40 is not laminated in the vicinity of the radial center of the second covering portion 46.

A third insertion hole 541 (see FIG. 2) is formed in the outer reinforcing layer 40. The third insertion hole 541 overlaps the first insertion hole 481 of the first covering portion 42 in the axial direction of the high-pressure vessel 10. The first tubular portion 221 is inserted through the first insertion hole 481 and the third insertion hole 541 (see FIG. 2). A distal end of the first tubular portion 221 is exposed to the outside of the outer reinforcing layer 40. The first cap 241 is attached to this distal end of the first tubular portion 221. Further, a fourth insertion hole 542 (see FIG. 3) is formed in the outer reinforcing layer 40. The fourth insertion hole 542 overlaps the second insertion hole 482 of the second covering portion 46 in the axial direction of the high-pressure vessel 10. The second tubular portion 222 is inserted through the second insertion hole 482 and the fourth insertion hole 542 (see FIG. 3). A distal end of the second tubular portion 222 is exposed to the outside of the outer reinforcing layer 40. The second cap 242 is attached to this distal end of the second tubular portion 222.

Figure 2:
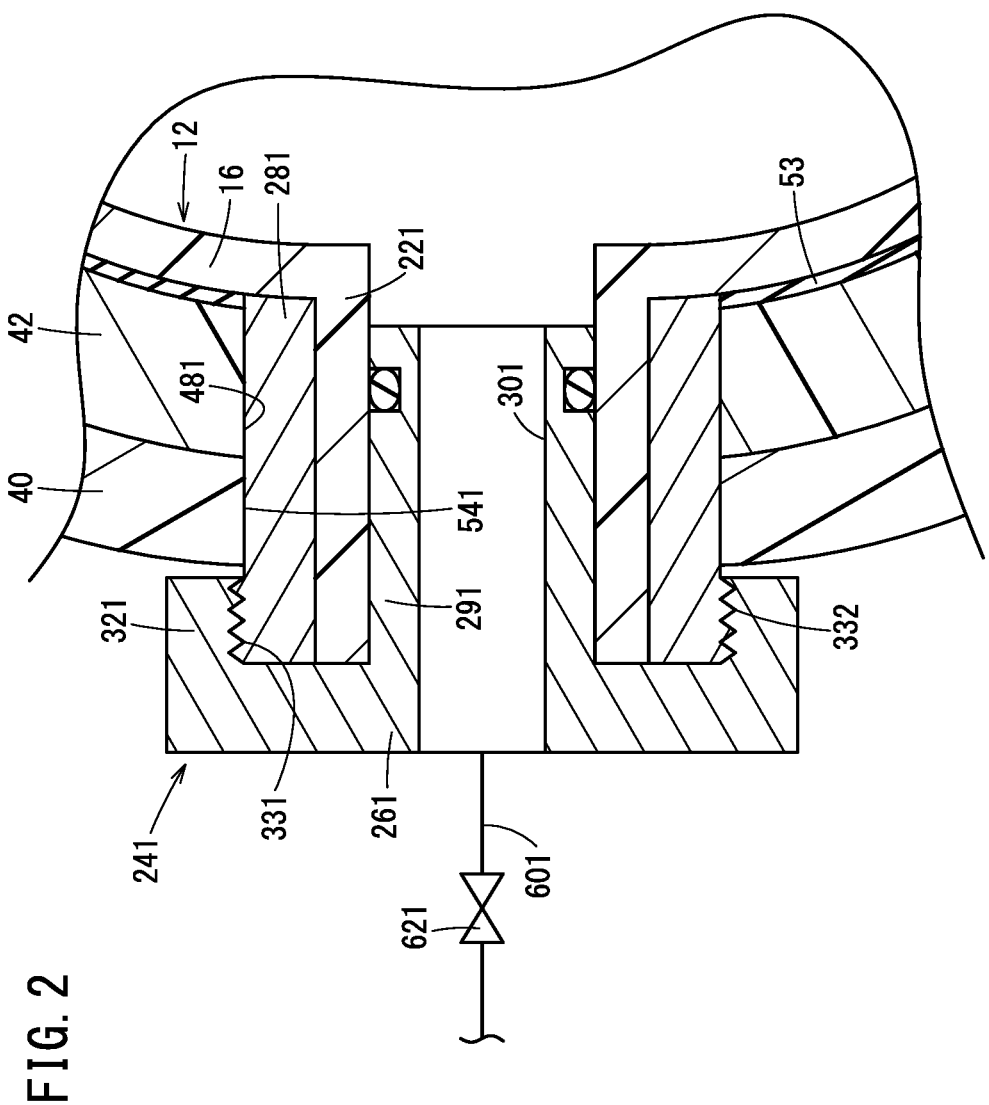
FIG. 2 is an enlarged view of a main part of a first dome portion and a vicinity of the first dome portion.

As shown in FIG. 2, a first end of a first flow pipe 601 is connected to the first passage 301 of the first inner cap 261 via a first pipe joint (not shown). A high-pressure gas supply source (not shown) is connected to a second end of the first flow pipe 601. The first flow pipe 601 is provided with a first valve 621. Further, as shown in FIG. 3, a first end of a second flow pipe 602 is connected to the second passage 302 of the second inner cap 262 via a second pipe joint (not shown). A high-pressure gas receiver (not shown) is connected to a second end of the second flow pipe 602. The second flow pipe 602 is provided with a second valve 622.

The high-pressure vessel 10 according to the present embodiment is basically configured in the manner described above. Hereinafter, a case where the high-pressure vessel 10 is mounted on a fuel cell vehicle will be described as an example. It should be noted that components other than the components illustrated in FIGS. 1 to 3 are not particularly illustrated.

In this case, the high-pressure gas is hydrogen gas. Further, the high-pressure gas supply source is, for example, a hydrogen gas storage tank provided in a hydrogen gas station. Furthermore, the high-pressure gas receiver is a fuel cell.

When the pressure of hydrogen gas in the high-pressure vessel 10 becomes equal to or lower than a predetermined pressure, it becomes necessary to fill the high-pressure vessel 10 with the hydrogen gas. In this case, a driver drives the fuel cell vehicle to move to the hydrogen gas station. Thereafter, the driver or an operator connects a supply hose to the second end of the first flow pipe 601. This connection automatically opens a main valve provided on the supply hose and the first valve 621 provided on the first flow pipe 601. The second valve 622 remains closed.

Since the main valve and the first valve 621 are opened while the second valve 622 is closed, hydrogen gas flows through the first flow pipe 601, the first pipe joint, and the first passage 301 toward the liner 12. The hydrogen gas is stored inside the liner 12.

When the pressure of the hydrogen gas in the high-pressure vessel 10 rises to the predetermined pressure or higher, the main valve and the first valve 621 are closed. The driver or the operator removes the supply hose from the first flow pipe 601. Further, when the driver presses a starter switch of the fuel cell vehicle, the second valve 622 is opened and the hydrogen gas is supplied to the fuel cell. At this time, the high-pressure gas discharged from the liner 12 flows through the second passage 302, the second pipe joint, and the second flow pipe 602.

When the driver stops the operation of the fuel cell vehicle, the second valve 622 is closed. Accordingly, the supply of the hydrogen gas from the high-pressure vessel 10 to the fuel cell is stopped.

Incidentally, the molecular radius of hydrogen gas (hydrogen molecules) is extremely small. Therefore, when the liner 12 is made of a resin, the hydrogen gas inevitably permeates through the liner 12. Here, the lubricating layer 53 is formed on the inner wall of the inner reinforcing layer 38. The lubricating layer 53 suppresses adhesion between the outer wall of the liner 12 and the inner wall of the inner reinforcing layer 38. Therefore, when the hydrogen gas permeates through the liner 12, the outer wall of the liner 12 and the inner wall of the inner reinforcing layer 38 are easily separated from each other by the pressure of the hydrogen gas. Accordingly, the hydrogen gas easily stays between the liner 12 and the inner reinforcing layer 38.

When the pressure of the hydrogen gas in the liner 12 is lowered, the hydrogen gas between the liner 12 and the inner reinforcing layer 38 is returned to the first passage 301 or the second passage 302 via a guide passage (not shown) provided in the high-pressure vessel 10. The hydrogen gas eventually merges with the hydrogen gas in the liner 12. In this manner, by forming the lubricating layer 53 on the inner wall of the inner reinforcing layer 38, it becomes easy to return the hydrogen gas that has permeated through the liner 12, into the liner 12.

Further, since the lubricating layer 53 prevents the outer wall of the liner 12 from adhering to the inner wall of the inner reinforcing layer 38, it is possible to avoid the occurrence of fatigue failure starting from the adhering portion between the outer wall of the liner 12 and the inner wall of the inner reinforcing layer 38. Thus, the durability of the high-pressure vessel 10 is improved.

Figure 4:
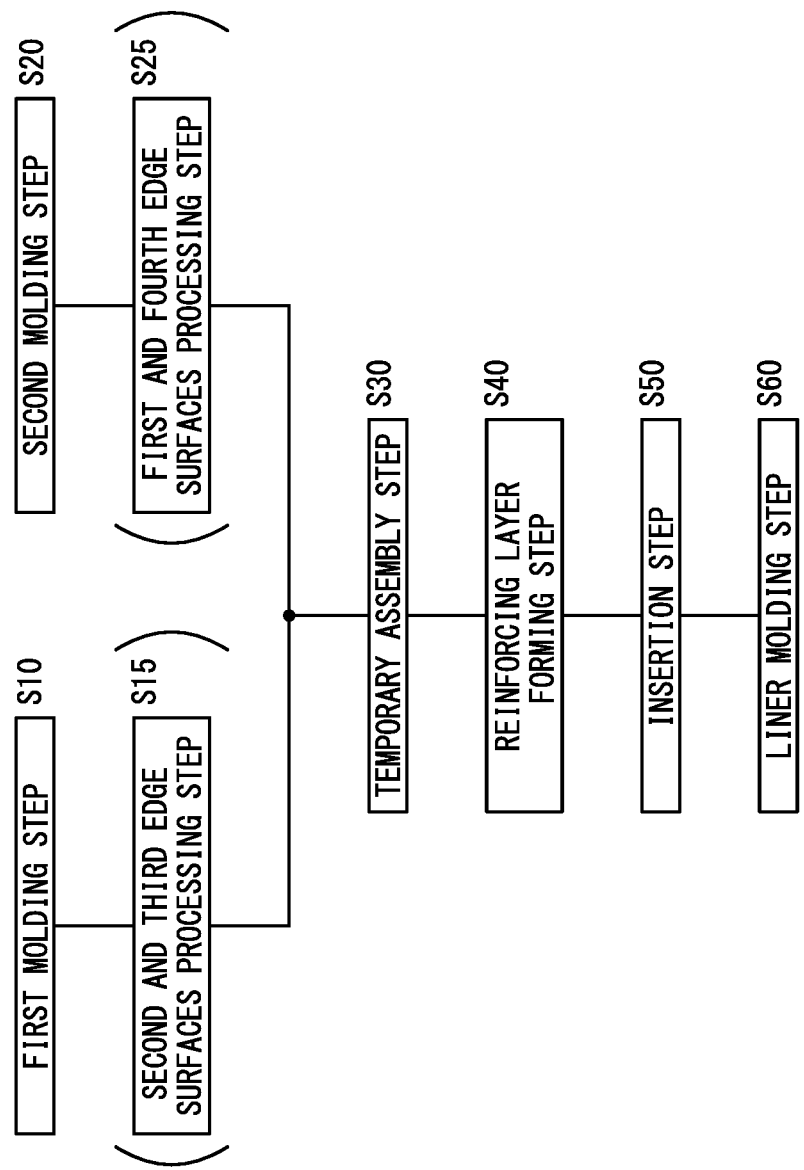
FIG. 4 is a schematic flow of a method for manufacturing the high-pressure vessel according to an embodiment of the present invention.

Next, a method for manufacturing the high-pressure vessel 10 according to the present embodiment will be described. FIG. 4 is a schematic flow of the method for manufacturing the high-pressure vessel 10. This manufacturing method includes a first molding step S10, a second molding step S20, a temporary assembly step S30, a reinforcing layer forming step S40, an insertion step S50, and a liner molding step S60.

When the first molding step S10 is performed, a tubular mandrel 70 (a first mold) shown in FIG. 5 is used. The tubular mandrel 70 can be rotated about a first rotating shaft 72 by a rotation mechanism (not shown).

In the first molding step S10, for example, a filament winding method is performed. Specifically, first, the first rotating shaft 72 and the tubular mandrel 70 are integrally rotated. The impregnated fiber 47 is fed from a bobbin (not shown) to the tubular mandrel 70. The impregnated fiber 47 is basically hoop-wound. As a result, hoop layers are sequentially laminated on the tubular mandrel 70 to form a tubular body 76. The tubular body 76 is made of a fiber-reinforced resin. At this point, it is not particularly necessary for the second edge surface 521 and the third edge surface 522 to be tapered inclined surfaces.

Figure 6A:
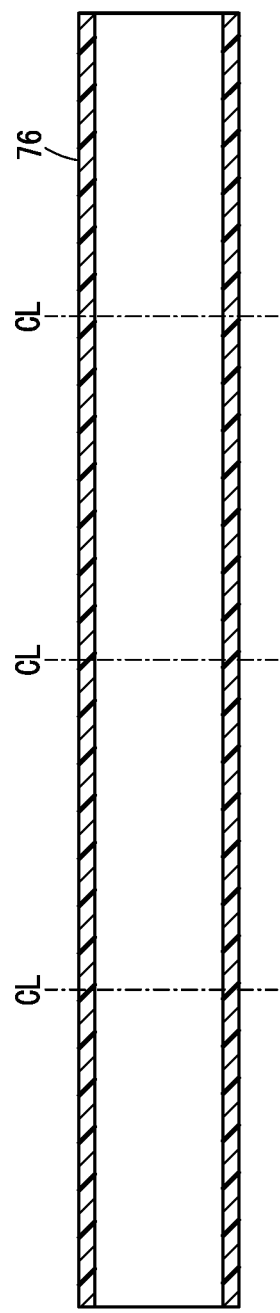
FIG. 6A is a schematic side cross-sectional view of the tubular body.
Figure 6B:
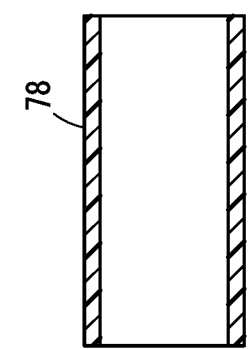
FIG. 6B is a schematic side cross-sectional view of a divided piece obtained by dividing the tubular body.

Next, as shown in FIG. 6A, the tubular body 76 is detached from the tubular mandrel 70. The tubular mandrel 70 has a length that is, for example, about four times the length of the third covering portion 44 of the high-pressure vessel 10. Therefore, the tubular body 76 is cut along cut lines CL in FIG. 6A to obtain a plurality of (for example, four) divided pieces 78 having appropriate lengths as shown in FIG. 6B. By obtaining the divided pieces 78 having desired lengths, the high-pressure vessel 10 having a desired length can be obtained. For example, the whole of the tubular body 76 may be formed as one third covering portion 44.

Next, a second and third edge surfaces processing step S15 is performed. That is, the edge surfaces of a first end portion and a second end portion of one divided piece 78 (or the uncut tubular body 76) in the longitudinal direction are processed.

Figure 6C:
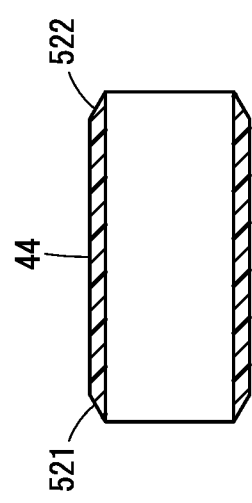
FIG. 6C is a schematic side cross-sectional view of a divided piece whose edge surface has been processed.

By this processing, as shown in FIG. 6C, the second edge surface 521, the outside diameter of which is reduced in a tapered shape toward the tip, is formed at the first end portion of the divided piece 78, and the third edge surface 522, the outer diameter of which is reduced in a tapered shape toward the tip, is formed at the second end portion of the divided piece 78. That is, the third covering portion 44 including the second edge surface 521 and the third edge surface 522 serving as tapered inclined surfaces is obtained.

Figure 7:
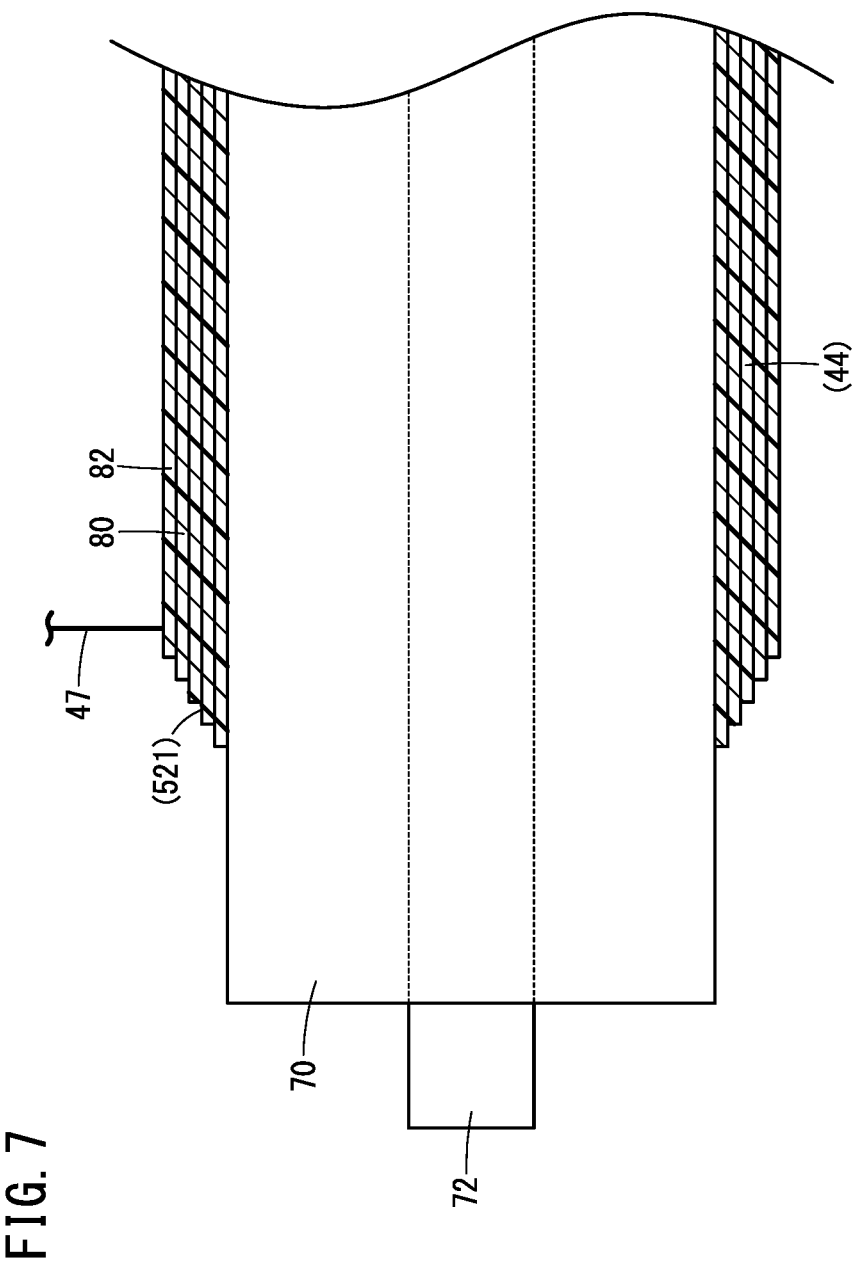
FIG. 7 is an enlarged view of a main part showing a state in which a tapered inclined surface is formed when impregnated fiber is wound around the tubular mandrel.

Note that, in a case where the whole of the tubular body 76 is formed as one third covering portion 44, it is also possible to form the second edge surface 521 and the third edge surface 522 serving as tapered inclined surfaces when the impregnated fiber 47 is wound around the tubular mandrel 70. Specifically, as shown in FIG. 7 in which the second edge surface 521 is enlarged, the thickness of the hoop layer is made minimum at the tips of the first end portion and the second end portion which are the end portions in the longitudinal direction. Further, the thickness of the hoop layer is made larger from the tip toward the intermediate portion in the longitudinal direction. In order to achieve this, when an upper layer 82 of the hoop layer is wound after a lower layer 80 is wound, the winding start position of the upper layer 82 is set to a position closer to the intermediate portion in the longitudinal direction than the winding start position of the lower layer 80. As a result, the second edge surface 521 and the third edge surface 522 are formed as tapered inclined surfaces. In this case, the second and third edges surfaces processing step S15 is unnecessary.

Figure 8A:
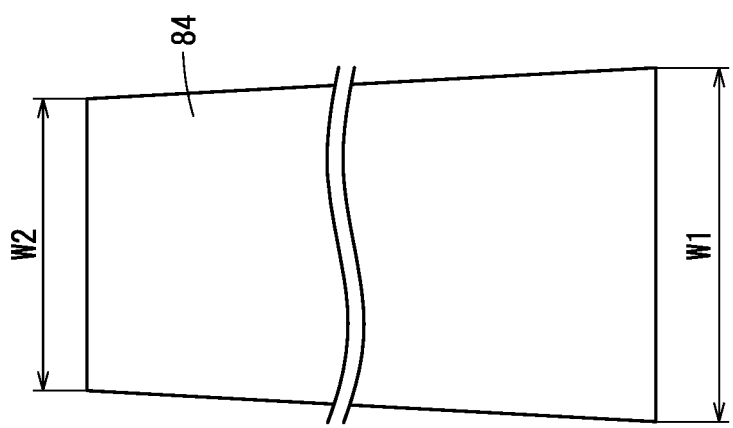
FIG. 8A is a schematic plan view of a sheet body whose dimension in the width direction gradually changes.
Figure 8B:
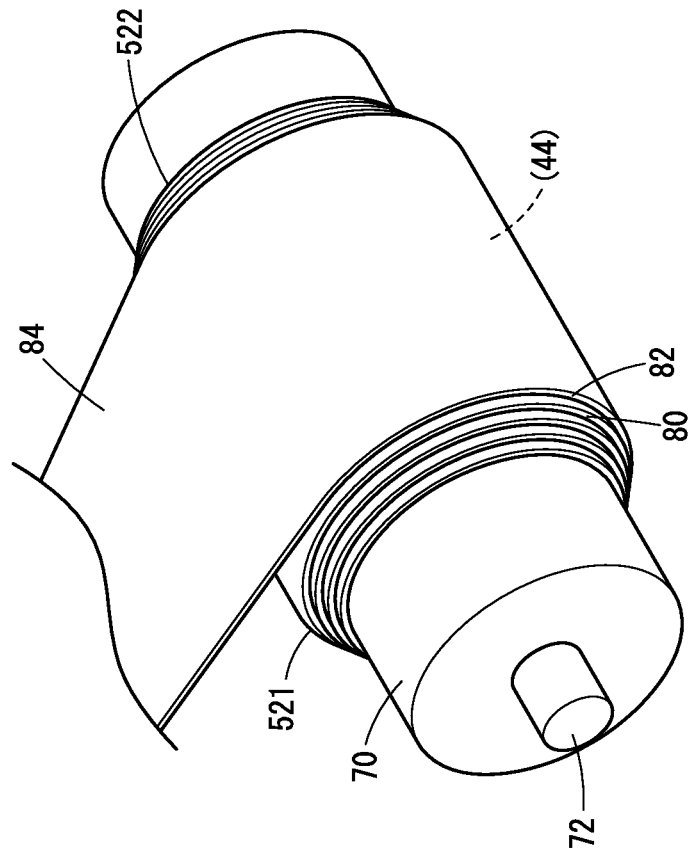
FIG. 8B is a schematic overall perspective view showing a state in which the sheet body is wound around the tubular mandrel to form a third covering portion.

Further, as shown in FIGS. 8A and 8B, it is also possible to perform the sheet winding method using a sheet body 84 of the impregnated fiber 47. When the whole of the tubular body 76 is formed as one third covering portion 44, it is preferable to use the sheet body 84 shown in FIG. 8A. In the sheet body 84, the dimension in the width direction orthogonal to the longitudinal direction is gradually reduced. That is, W1>W2 is established, where W1 is the width of the preceding portion to be fed first, and W2 is the width of the succeeding portion to be fed later.

Therefore, as the sheet body 84 is wound around the tubular mandrel 70, the upper layer 82 of the hoop layer becomes narrower than the lower layer 80, as shown in FIG. 8B. That is, both end portions of the upper layer 82 in the longitudinal direction are closer to the intermediate portion in the longitudinal direction than both end portions of the lower layer 80 in the longitudinal direction. As a result, the second edge surface 521 and the third edge surface 522 are formed as tapered inclined surfaces. Therefore, also in this case, the second and third edge surfaces processing step S15 becomes unnecessary.

The second molding step S20 will be described. Not that the first molding step S10 and the second molding step S20 can be performed in any order. Alternatively, the second molding step S20 can be performed simultaneously with the first molding step S10. In this case, the first molding step S10 is performed at one work station, and at the same time, the second molding step S20 is performed at another work station. In this manner, it is not particularly necessary to perform one of the first molding step S10 or the second molding step S20 first, and then perform the remaining one of the first molding step S10 or the second molding step S20.

Figure 9:
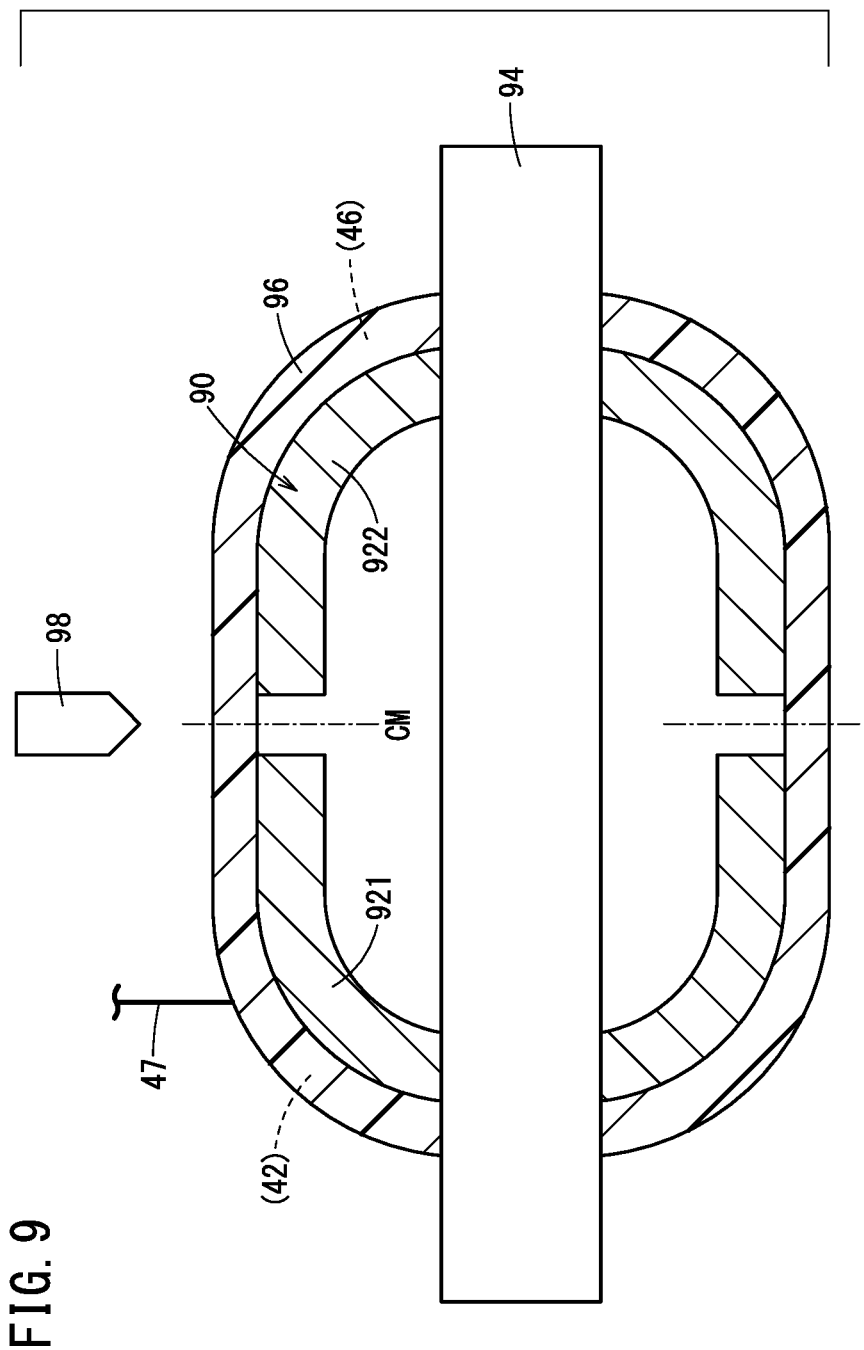
FIG. 9 is a schematic side view showing a state in which a first covering portion and a second covering portion are produced using a capsule-shaped mandrel.

When the second molding step S20 is performed, a capsule-shaped mandrel 90 (a second mold) shown in FIG. 9 is used. The capsule-shaped mandrel 90 includes a first cup-shaped molding portion 921 and a second cup-shaped molding portion 922. In each of the first cup-shaped molding portion 921 and the second cup-shaped molding portion 922, one end portion thereof is an open end, and the other end portion thereof is a closed end. The first cup-shaped molding portion 921 and the second cup-shaped molding portion 922 are held by a second rotating shaft 94. At this time, the open end of the first cup-shaped molding portion 921 and the open end of the second cup-shaped molding portion 922 face each other while being slightly separated from each other.

The capsule-shaped mandrel 90 can be rotated about the second rotating shaft 94 by a rotation mechanism (not shown).

In the second molding step S20, for example, a filament winding method is performed. Specifically, first, the second rotating shaft 94 and the capsule-shaped mandrel 90 (the first cup-shaped molding portion 921 and the second cup-shaped molding portion 922) are integrally rotated. The impregnated fiber 47 is fed from a bobbin (not shown) to the capsule-shaped mandrel 90. The impregnated fiber 47 is basically wound in a low-angle helical manner. As a result, low-angle helical layers are sequentially laminated on the capsule-shaped mandrel 90 to form a capsule-shaped body 96 made of the fiber-reinforced resin.

Figure 10A:
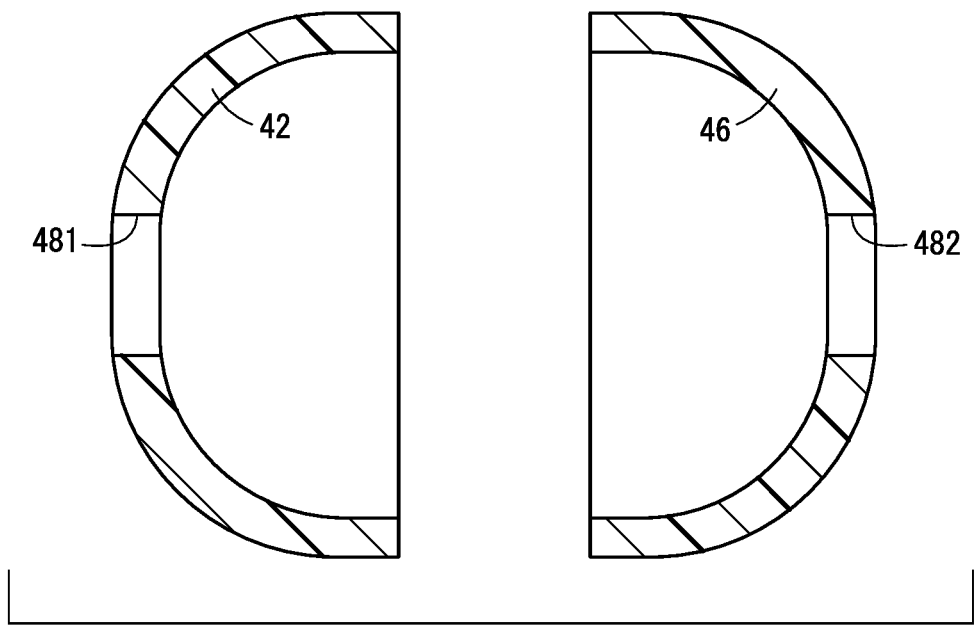
FIG. 10A is a schematic side cross-sectional view of the first covering portion and the second covering portion that have been detached.

Next, in a state in which the capsule-shaped body 96 is continuously rotated, a cutter 98 is advanced from the outside of the capsule-shaped body 96 toward a separation portion (a cut line CM) between the first cup-shaped molding portion 921 and the second cup-shaped molding portion 922. Thus, the capsule-shaped body 96 is divided into two parts. As a result, the first covering portion 42 and the second covering portion 46 are obtained. Thereafter, as shown in FIG. 10A, the first covering portion 42 and the second covering portion 46 are detached from the capsule-shaped mandrel 90. Since the impregnated fiber 47 is not wound around the second rotating shaft 94, the first insertion hole 481 is formed in the first covering portion 42. Similarly, the second insertion hole 482 is formed in the second covering portion 46. The first insertion hole 481 and the second insertion hole 482 are first openings.

Figure 10B:
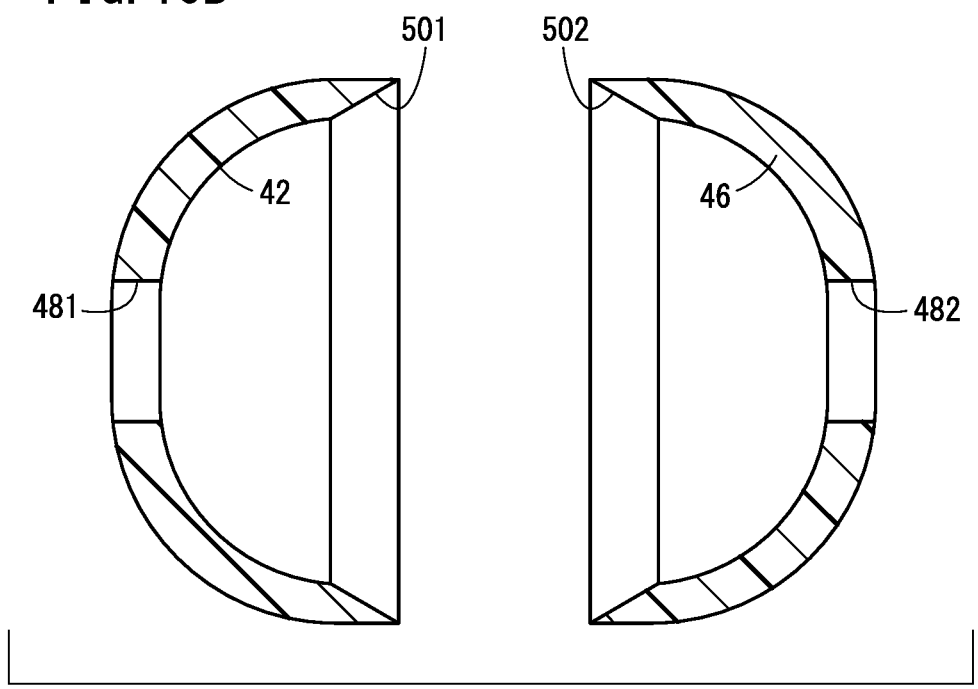
FIG. 10B is a schematic side cross-sectional view of the first covering portion and the second covering portion whose edge surfaces have been processed.

Next, a first and fourth edge surfaces processing step S25 is performed. That is, as shown in FIG. 10B, the edge surface of the open end of the first covering portion 42 is processed. By this processing, the first edge surface 501, the inner diameter of which is increased in a tapered shape toward the tip of the open end, is formed in the first covering portion 42. The same processing is performed on the edge surface of the open end of the second covering portion 46. By this processing, the fourth edge surface 502, the inner diameter of which is increased in a tapered shape toward the tip of the open end, is formed in the second covering portion 46. That is, the first covering portion 42 having the first edge surface 501 as a tapered inclined surface, and the second covering portion 46 having the fourth edge surface 502 as a tapered inclined surface, are obtained.

Figure 11A:
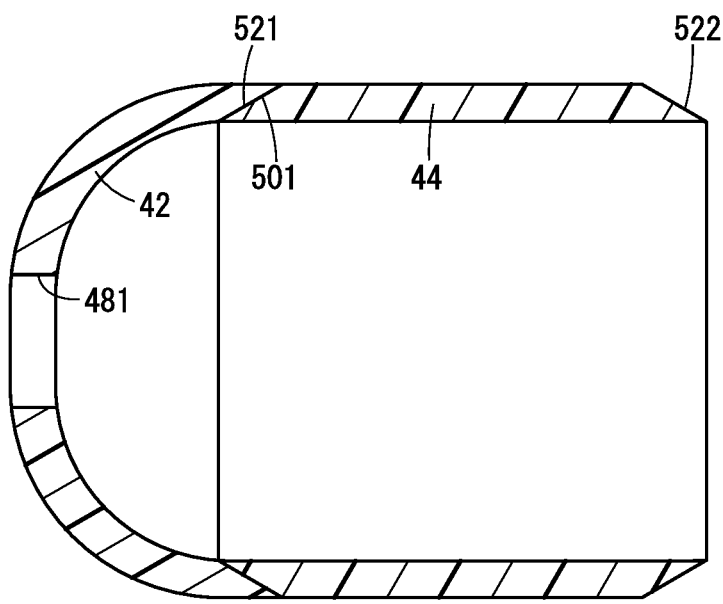
FIG. 11A is a schematic side cross-sectional view showing a state in which the edge surfaces of the first covering portion and the third covering portion are brought into contact with each other.

Next, the temporary assembly step S30 of temporarily assembling the inner reinforcing layer 38 is performed. First, as shown in FIG. 11A, the first edge surface 501 of the first covering portion 42 and the second edge surface 521 of the third covering portion 44 are brought into contact with each other. The first edge surface 501 and the second edge surface 521 are tapered inclined surfaces having the same inclination direction. Therefore, the first edge surface 501 and the second edge surface 521 overlap each other and come into close contact with each other. Accordingly, the first covering portion 42 and the third covering portion 44 are less likely to be displaced from each other.

Figure 11B:
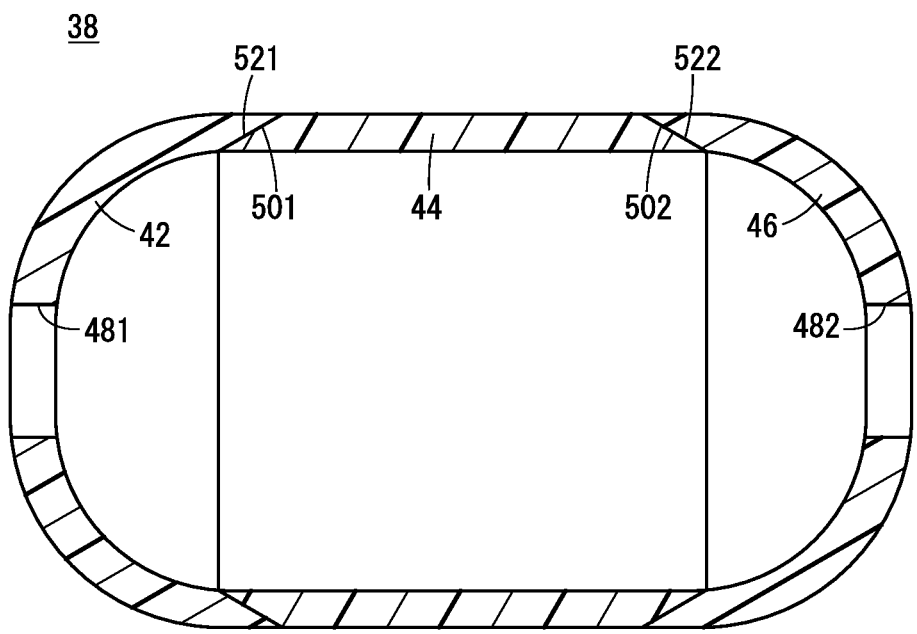
FIG. 11B is a schematic side cross-sectional view showing a state in which the edge surfaces of the third covering portion and the second covering portion are brought into contact with each other.

Thereafter, as shown in FIG. 11B, the third edge surface 522 of the third covering portion 44 and the fourth edge surface 502 of the second covering portion 46 are brought into contact with each other. The third edge surface 522 and the fourth edge surface 502 are also tapered inclined surfaces having the same inclination direction. Therefore, the third edge surface 522 and the fourth edge surface 502 overlap each other and come into close contact with each other. Accordingly, the third covering portion 44 and the second covering portion 46 are less likely to be displaced from each other. As a result, a temporary assembly of the inner reinforcing layer 38 is obtained.

As described above, since the first edge surface 501 to the fourth edge surface 502 are formed as tapered inclined surfaces, it is possible to easily position the first covering portion 42 and the second covering portion 46 with respect to the third covering portion 44. Conversely, the first edge surface 501 and the second edge surface 521 may be brought into contact with each other after the third edge surface 522 and the fourth edge surface 502 are brought into contact with each other.

Thereafter, the first outer cap 281 is inserted into the first insertion hole 481 of the first covering portion 42. Further, the second outer cap 282 is inserted into the second insertion hole 482 of the second covering portion 46. In this state, next, the reinforcing layer forming step S40 is performed. In the reinforcing layer forming step S40, the outer reinforcing layer 40 is provided outside the inner reinforcing layer 38.

Figure 12:
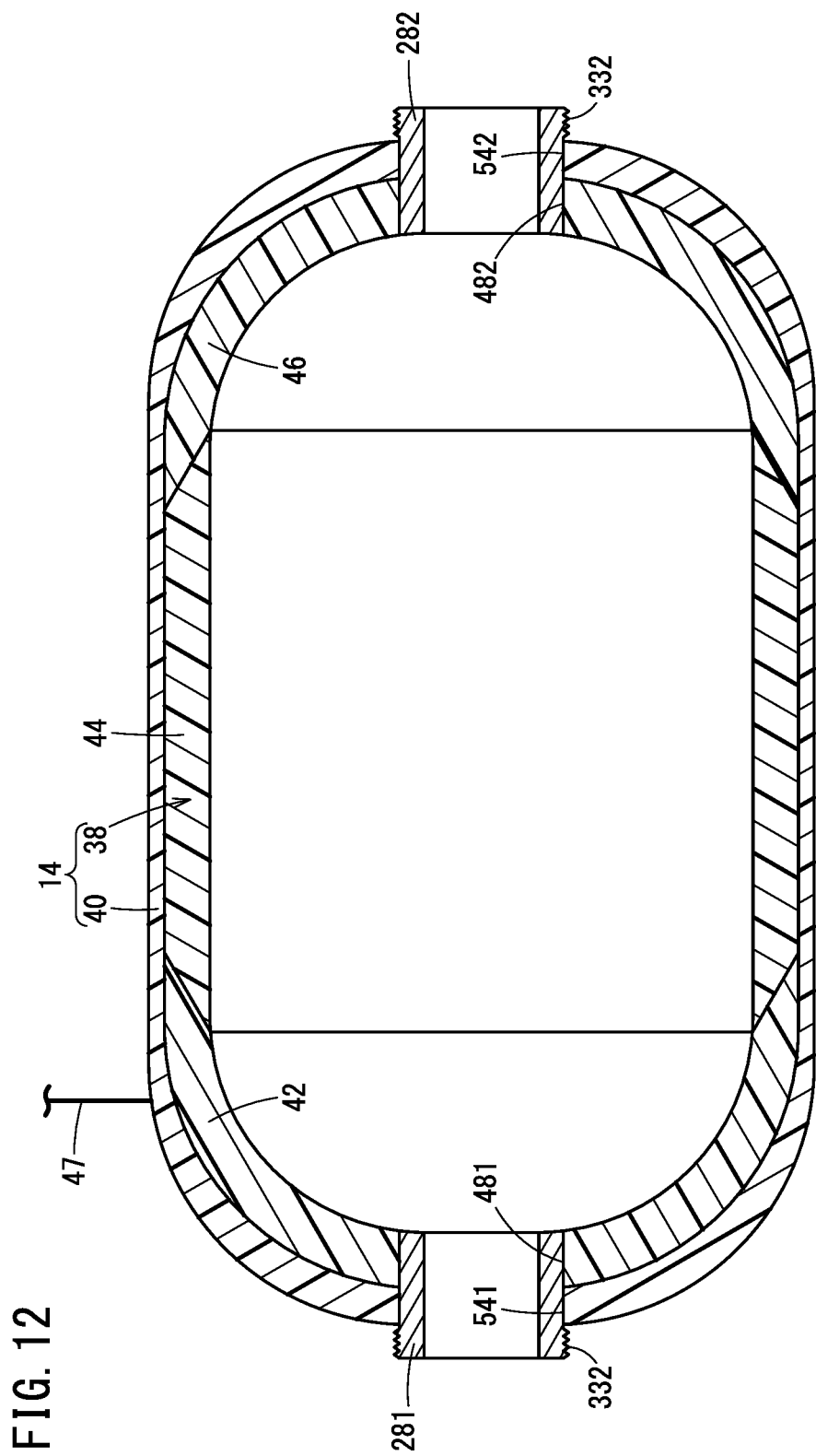
FIG. 12 is a schematic side cross-sectional view showing a state in which an outer reinforcing layer is formed on a temporary assembly.

Specifically, for example, as shown in FIG. 12, the impregnated fiber 47 is wound around the temporary assembly (the inner reinforcing layer 38) by a filament winding method. At this time, high-angle helical winding is mainly performed, whereby high-angle helical layers are sequentially laminated. Thus, the outer reinforcing layer 40 covering the inner reinforcing layer 38 from the outside is obtained. The reinforcing layer 14 is formed by the inner reinforcing layer 38 and the outer reinforcing layer 40. A part of the outer reinforcing layer 40 may be a low-angle helical layer.

The outer reinforcing layer 40 covers a part of a portion of the first outer cap 281 that is exposed from the first insertion hole 481. Similarly, the outer reinforcing layer 40 covers a part of a portion of the second outer cap 282 that is exposed from the second insertion hole 482. Therefore, a third insertion hole 541 continuous with the first insertion hole 481, and a fourth insertion hole 542 continuous with the second insertion hole 482, are formed in the outer reinforcing layer 40. The third insertion hole 541 and the fourth insertion hole 542 are second openings.

The first outer cap 281 passes through the first insertion hole 481 and the third insertion hole 541. The distal end of the first outer cap 281 is exposed to the outside of the outer reinforcing layer 40 from the third insertion hole 541. Further, the second outer cap 282 passes through the second insertion hole 482 and the fourth insertion hole 542. The distal end of the second outer cap 282 is exposed to the outside of the outer reinforcing layer 40 from the fourth insertion hole 542.

Figure 13:
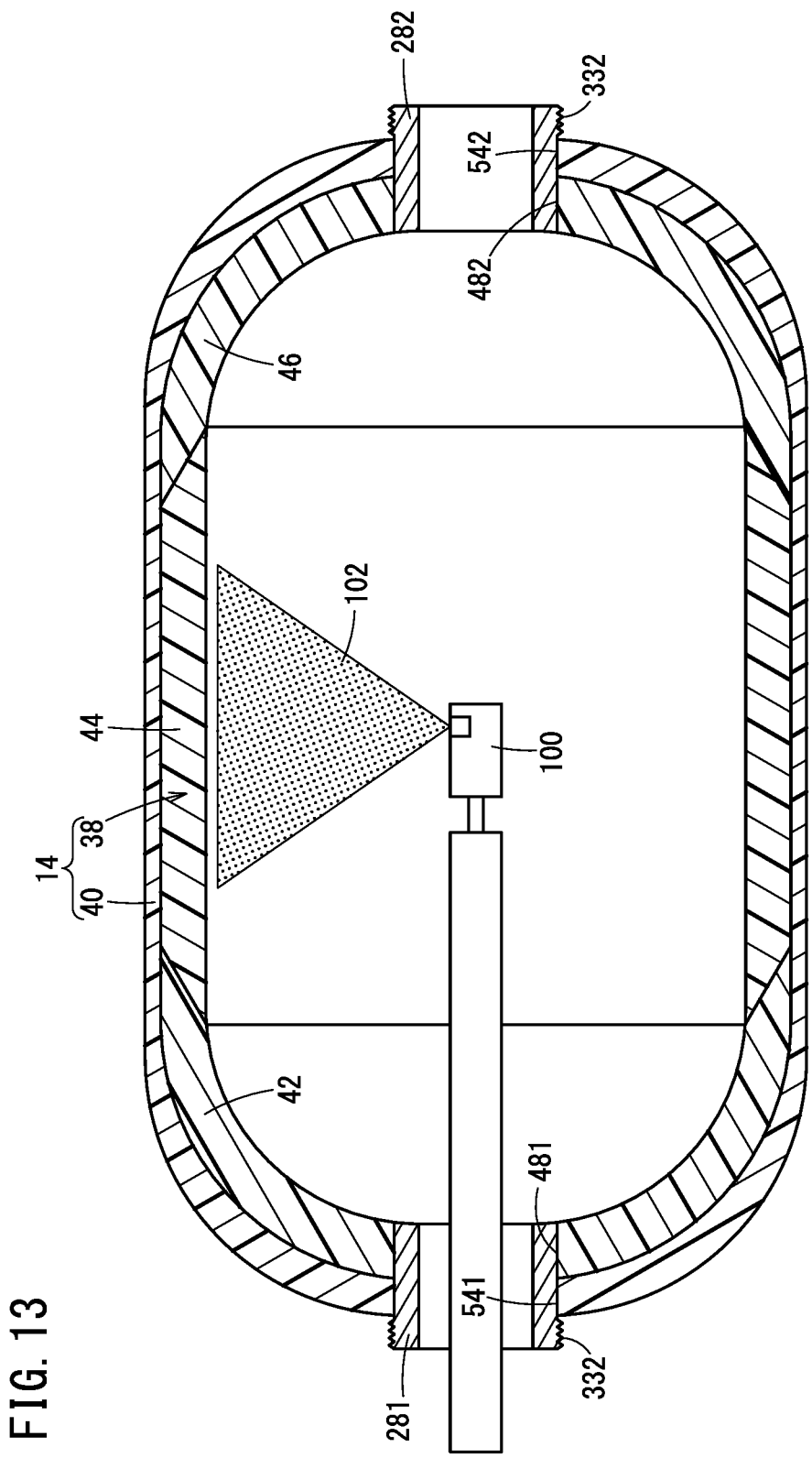
FIG. 13 is a schematic side cross-sectional view showing a state in which a lubricant is applied to the inner wall of an inner reinforcing layer.

Next, an application step is performed. For example, as shown in FIG. 13, an application nozzle 100 is passed through the interior of the first outer cap 281, and the application nozzle 100 is inserted into the inner side of the inner reinforcing layer 38. The application nozzle 100 faces the inner wall of the inner reinforcing layer 38. In this state, the lubricant 102 is discharged from the application nozzle 100. The application nozzle 100 rotates relative to the inner reinforcing layer 38, and moves relative to the inner reinforcing layer 38 from the first covering portion 42 toward the second covering portion 46. Thus, the lubricant 102 is applied to the entire inner wall of the inner reinforcing layer 38. The lubricant 102 adheres to the inner wall of the inner reinforcing layer 38. As a result, the lubricating layer 53 (see FIG. 14) is formed.

Figure 14:
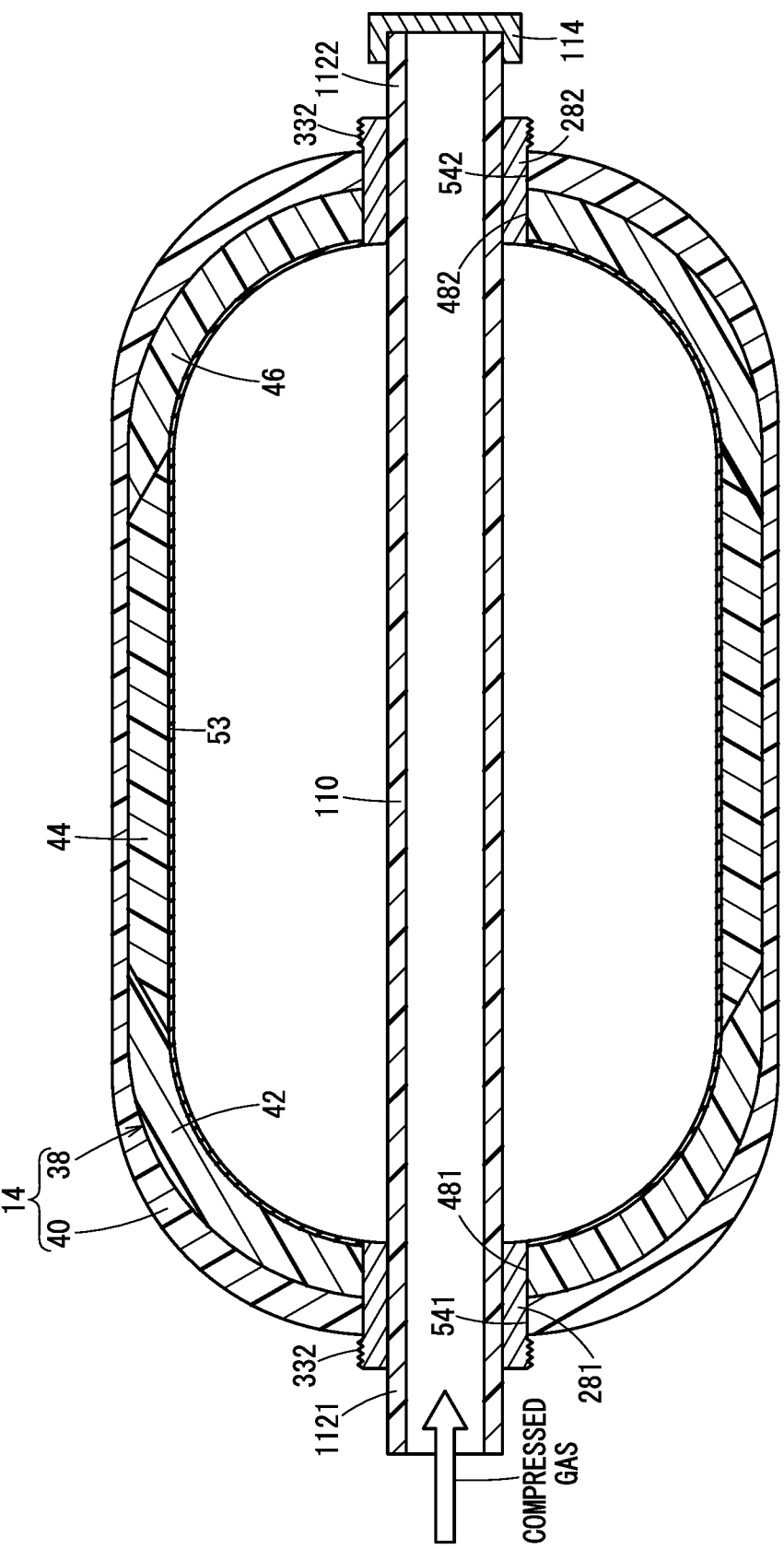
FIG. 14 is a schematic side cross-sectional view showing a state in which a hollow preform is inserted into a reinforcing layer.

Next, the insertion step S50 is performed. In the insertion step S50, as shown in FIG. 14, a hollow preform 110 is inserted into the inner side of the inner reinforcing layer 38. The hollow preform 110 is expanded and formed into the liner 12 as described below. The hollow preform 110 is made of, for example, the above-described resin and has a cylindrical shape.

When the hollow preform 110 is inserted into the inner side of the reinforcing layer 14, a second end 1122 of the hollow preform 110 in the longitudinal direction passes through the interior of the first outer cap 281. In other words, the second end 1122 is passed through the first insertion hole 481 and the third insertion hole 541 of the reinforcing layer 14 via the first outer cap 281. The second end 1122 is then inserted into the second outer cap 282. Further, a first end 1121 of the hollow preform 110 in the longitudinal direction is inserted into the first outer cap 281. As a result, the hollow preform 110 is supported by the first outer cap 281 and the second outer cap 282.

Next, a closing member 114 shown in FIG. 14 is attached to, for example, the second end 1122 of the hollow preform 110. Further, the hollow preform 110 is heated through the reinforcing layer 14 to soften the hollow preform 110. In this state, the liner molding step S60 is performed. That is, compressed gas (for example, compressed air) is supplied to the interior of the hollow preform 110 through the first end 1121. The hollow preform 110 is expanded under the pressure of the compressed gas.

A portion of the outer wall of the expanded hollow preform 110 comes into contact with the inner wall of the inner reinforcing layer 38 before other portions. Thereafter, the other portions of the hollow preform 110 are expanded. During this, the portion of the hollow preform 110 that has already come into contact with the inner wall of the inner reinforcing layer 38 slides relative to the inner wall of the inner reinforcing layer 38. Therefore, the outer wall of the hollow preform 110 can extend along the surface direction after coming into contact with the inner reinforcing layer 38. Accordingly, it is possible for the hollow preform to expand more easily.

Figure 15:
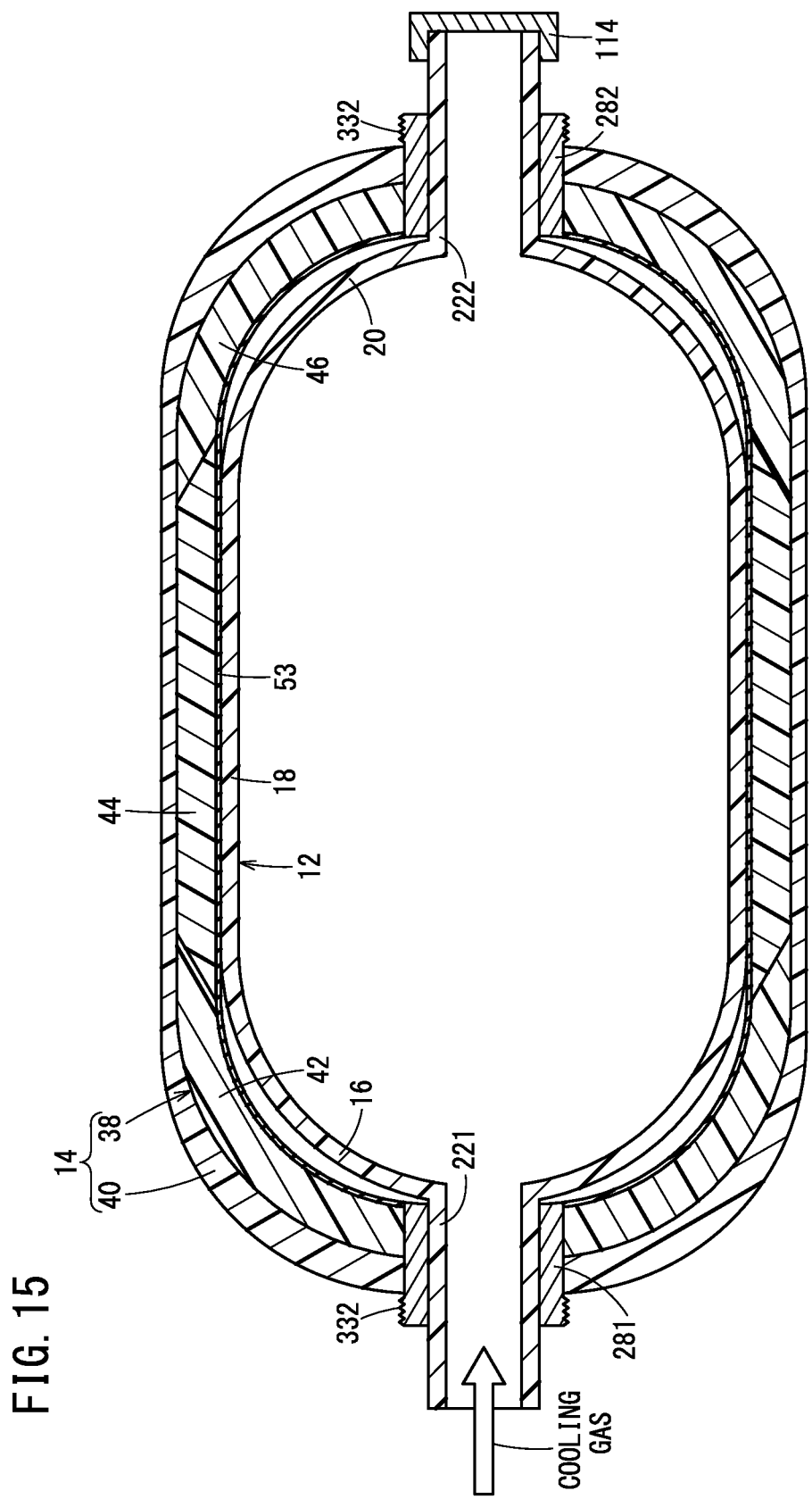
FIG. 15 is a schematic side cross-sectional view showing a state in which the hollow preform on the inner side of the reinforcing layer is expanded to form a liner.

The expansion of the hollow preform 110 is terminated, for example, when most part of the outer wall of the hollow preform 110 had come into contact with the inner wall of the inner reinforcing layer 38. At this time, the shape of the hollow preform 110 generally corresponds to the shape of the inner reinforcing layer 38. That is, the hollow preform 110 is changed into the liner 12 shown in FIG. 15. The liner 12 includes the first dome portion 16, the body portion 18, and the second dome portion 20. As described above, the first dome portion 16 is covered with the first covering portion 42. The body portion 18 is covered with the third covering portion 44. The second dome portion 20 is covered with the second covering portion 46. The first end 1121 is formed into the first tubular portion 221, and the second end 1122 is formed into the second tubular portion 222.

As described above, in the liner molding step S60, blow-molding in which the hollow preform 110 is expanded by using the inner reinforcing layer 38 as a pseudo mold is performed. When the blow molding is completed, for example, a slight gap may be formed between the first dome portion 16 and the first covering portion 42, and between the second dome portion 20 and the second covering portion 46.

After the hollow preform 110 is sufficiently expanded into the liner 12, the supply of the compressed gas to the liner 12 is stopped. Although it is possible to cure the liner 12 in this state, it is more preferable to supply cooling gas to the interior of the liner 12. This is because the curing of the liner 12 is promoted by the cooling gas.

Figure 16:
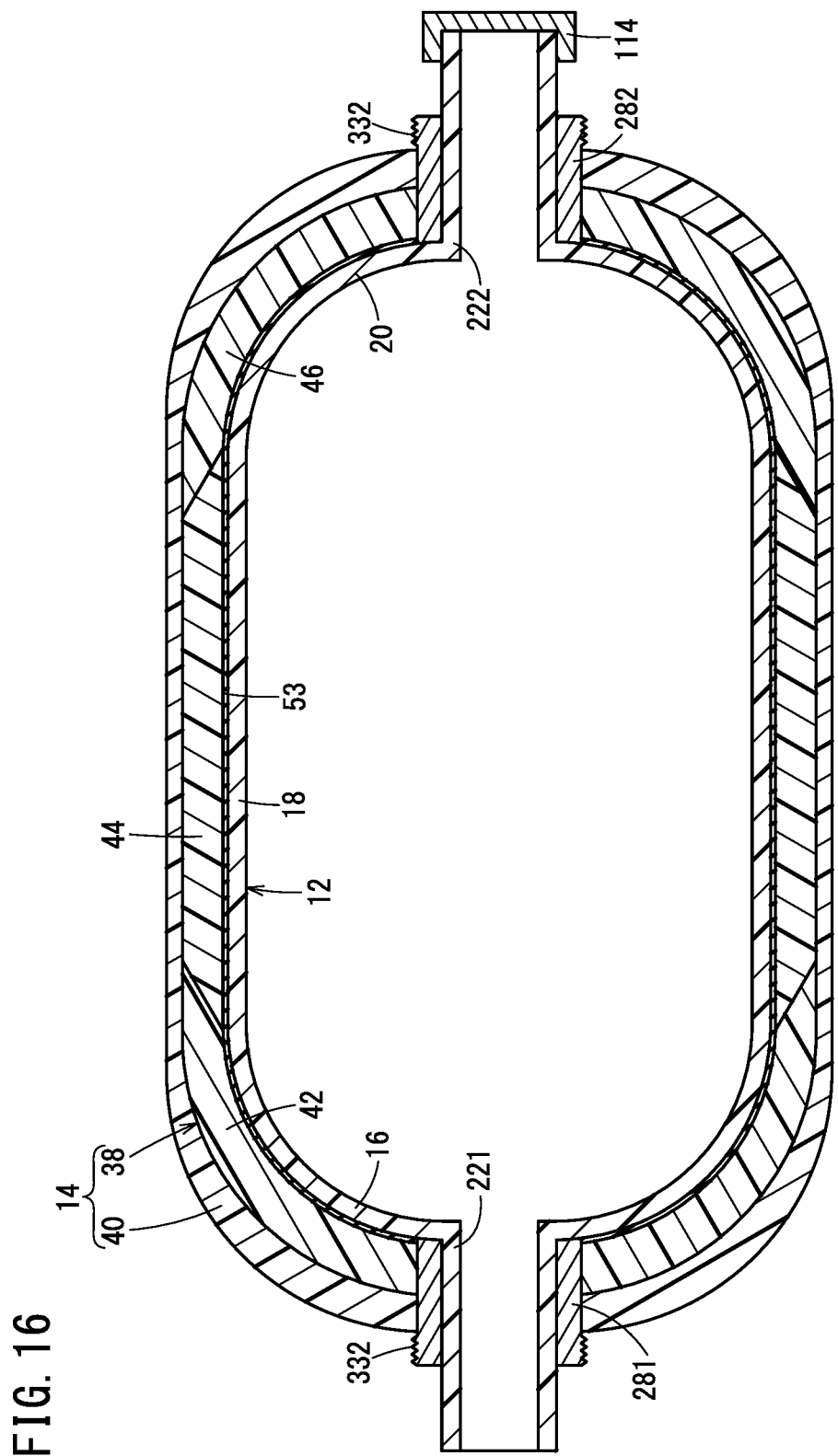
FIG. 16 is a schematic side cross-sectional view showing a state in which the shape of the liner has been corrected.

In this case, it is preferable to supply the cooling gas at a pressure higher than that of the compressed gas supplied at the time of blow molding. The cooling gas pushes the liner 12 from the inside toward the outside. Accordingly, when the liner 12 includes a portion (for example, the first dome portion 16) whose outer wall is not in contact with the inner wall of the inner reinforcing layer 38, the portion is pushed out toward the inner reinforcing layer 38. As a result, as shown in FIG. 16, the outer wall of this portion comes into contact with the inner wall of the inner reinforcing layer 38. The cooling gas also inhibits the liner 12 from shrinking inward due to thermal contraction.

By setting the pressure of the cooling gas higher than the pressure of the compressed gas at the time of blow molding, the shape of the liner 12 during cooling can be maintained. Therefore, the volume of the internal space of the liner 12 becomes sufficiently large. That is, the liner 12 has an internal space capable of storing a large amount of gas (hydrogen or the like).

Thus, the high-pressure vessel 10 including the liner 12 located on the inner side and the reinforcing layer 14 located on the outer side is obtained. For the reasons described above, formation of the liner 12 that has been insufficiently expanded is avoided. Further, since the inner reinforcing layer 38 restrains the hollow preform 110, the thickness of the expanded liner 12 is prevented from varying at different locations. Furthermore, formation of an excessive gap between the liner 12 and the first dome portion 16 or the second dome portion 20 is suppressed.

Thereafter, the female thread 331 of the cap portion 321 of the first inner cap 261 is screwed to the male thread 332 at the distal end of the first outer cap 281 (see FIG. 2). Similarly, the female thread 331 of the cap portion 322 of the second inner cap 262 is screwed to the male thread 332 at the distal end of the second outer cap 282 (see FIG. 3). As a result, the first cap 241 is provided at the first tubular portion 221, and the second cap 242 is provided at the second tubular portion 222.

When the blow molding is completed, most part of the outer wall of the liner 12 is into contact with the inner wall of the inner reinforcing layer 38. When the cooling gas is supplied, the portion whose outer wall is in contact with the inner wall of the inner reinforcing layer 38 receives pressure from the reinforcing layer 14. Therefore, expansion of this portion is suppressed.

In general blow molding, a molded product having a shape following the shape of a mold is obtained. Therefore, for example, when individually molding liners 12 having varying lengths by blow molding, molds having varying lengths must be individually produced. As a result, equipment investment rises significantly.

In the present embodiment, as described above, the length of the third covering portion 44 of the inner reinforcing layer 38 can be appropriately determined. In other words, it is easy to individually obtain the reinforcing layers 14 having varying lengths. For example, when the length of the reinforcing layer 14 is large, the hollow preform 110 having a large length is selected. On the other hand, when the length of the reinforcing layer 14 is small, the hollow preform 110 having a small length is selected. The hollow preform 110 is then expanded on the inner side of the reinforcing layer 14 as described above. As a result, the liner 12 having a length corresponding to the length of the reinforcing layer 14 can be obtained.

As can be understood from the above, according to the present embodiment, it is not necessary to prepare molds having various lengths. Therefore, the high-pressure vessel 10 having a desired length can be mass-produced at a low cost. In addition, a space for storing the mold is not required. Therefore, it is possible to achieve space saving of a manufacturing station of the high-pressure vessel 10.

As described above, according to the present embodiment, there is disclosed a high-pressure vessel (10) comprising a liner (12) that is hollow, and a reinforcing layer (14) configured to cover the liner from outside, wherein the liner includes a body portion (18) having a tubular shape, and a first dome portion (16) and a second dome portion (20) respectively connected to longitudinal both end portions of the body portion, the reinforcing layer includes an inner reinforcing layer (38) made of a fiber-reinforced resin and configured to cover the liner from outside, and an outer reinforcing layer (40) made of the fiber-reinforced resin and configured to cover the inner reinforcing layer from outside, the inner reinforcing layer includes a first covering portion (42) configured to cover the first dome portion, a second covering portion (46) configured to cover the second dome portion, and a third covering portion (44) configured to cover the body portion, a first edge surface (501) of the first covering portion that faces the third covering portion and a second edge surface (521) of the third covering portion that faces the first covering portion are brought into contact with each other, and a third edge surface (522) of the third covering portion that faces the second covering portion and a fourth edge surface (502) of the second covering portion that faces the third covering portion are brought into contact with each other, and the outer reinforcing layer covers the first covering portion, the third covering portion, and the second covering portion from outside.

In this configuration, a reinforcing layer having a desired length can be obtained by producing the third covering portion with an appropriate length and providing the outer reinforcing layer on the outside of the inner reinforcing layer. Thereafter, the hollow preform having a length corresponding to the length of this reinforcing layer is expanded on the inner side of the reinforcing layer. In this manner, a high-pressure vessel having a desired length can be obtained.

The first edge surface, the second edge surface, the third edge surface, and the fourth edge surface are preferably tapered inclined surfaces. In this case, the first covering portion is less likely to be displaced relative to the third covering portion. Similarly, the second covering portion is less likely to be displaced relative to the third covering portion. That is, it is easy to linearly arrange the first covering portion, the third covering portion, and the second covering portion in parallel.

It is preferable that a lubricating layer (53) is formed on an inner wall of the inner reinforcing layer, the inner wall facing the liner. The lubricating layer inhibits the liner from adhering to the inner reinforcing layer. In the case where the liner is made of resin, when a gas, such as hydrogen gas, having a small molecular radius is stored, the gas permeates through the liner. Since the liner does not adhere to the inner reinforcing layer, the gas can easily stay between the liner and the inner reinforcing layer.

According to another embodiment, there is provided a method for manufacturing a high-pressure vessel (10) including a liner (12) that is hollow, and a reinforcing layer (14) configured to cover the liner from outside, the method comprising: a first molding step (S10) of molding a tubular body (76) made of a fiber-reinforced resin by winding resin-impregnated reinforcing fiber (47) around a first mold (70); a second molding step (S20) of simultaneously molding a first covering portion (42) and a second covering portion (46) each made of the fiber-reinforced resin by winding the resin-impregnated reinforcing fiber around a second mold (90); a temporary assembly step (S30) of temporarily assembling an inner reinforcing layer (38) by using a part or whole of the tubular body as a third covering portion (44), the inner reinforcing layer (38) including the first covering portion, the third covering portion, and the second covering portion, and by bringing a first edge surface (501) of the first covering portion that faces the third covering portion into contact with a second edge surface (521) of the third covering portion that faces the first covering portion, and bringing a third edge surface (522) of the third covering portion that faces the second covering portion into contact with a fourth edge surface (502) of the second covering portion that faces the third covering portion; a reinforcing layer forming step (S40) of winding the resin-impregnated reinforcing fiber around the inner reinforcing layer to obtain an outer reinforcing layer (40) configured to cover the inner reinforcing layer from outside, thereby obtaining a reinforcing layer including the inner reinforcing layer and the outer reinforcing layer; an insertion step (S50) of inserting a hollow preform (110) into an inner side of the inner reinforcing layer through a first opening (481, 482) formed in the first covering portion or the second covering portion, and a second opening (541, 542) formed in the outer reinforcing layer and overlapping the first opening; and a liner molding step (S60) of supplying a gas into the hollow preform to expand the hollow preform and then curing the expanded hollow preform to obtain the liner including a first dome portion (16), a body portion (18), and a second dome portion (20), wherein an outer side of the first dome portion is covered with the first covering portion, an outer side of the body portion is covered with the third covering portion, and an outer side of the second dome portion is covered with the second covering portion.

In this manufacturing method, the tubular body molded in the first molding step can have any length. For example, when a long tubular body is produced, it is possible to obtain a long high-pressure vessel by expanding a long hollow preform on the inner side of the reinforcing layer. On the other hand, when a short tubular body is produced, it is possible to obtain a short high-pressure vessel by expanding a short hollow preform on the inner side of the reinforcing layer.

In this embodiment, after the reinforcing layer having a desired length is produced, the hollow preform having a length corresponding to the length of this reinforcing layer is used to mold the liner. Therefore, it is not necessary to prepare molds of various shapes or dimensions. As a result, it is possible to reduce equipment investment. Further, a space for storing a large number of molds is not required. Therefore, it is also possible to achieve space saving of a manufacturing station of the high-pressure vessel.

When the expanded hollow preform is cured, it is preferable to supply a cooling gas having a lower temperature and a higher pressure than the gas supplied when the hollow preform is expanded. Since the temperature of the cooling gas is low, cooling (curing) of the hollow preform is promoted. In addition, in a case where a portion which is not sufficiently expanded remains in the hollow preform, the portion can be expanded before being cured. This is because the pressure of the cooling gas is high. As a result, the shape of the hollow preform can be corrected.

The tubular body obtained in the first molding step may be divided into a plurality of divided pieces (78). In this case, one of the divided pieces is used as the third covering portion, and the inner reinforcing layer is temporarily assembled. As a result, a plurality of third covering portions each having a desired length can be obtained in a single first molding step.

In this case, it is preferable to perform a second and third edge surfaces processing step (S15) on the individual divided pieces, after the first molding step. That is, the second edge surface and the third edge surface of the third covering portion are processed into tapered inclined surfaces. Further, it is preferable to perform a first and fourth edge surfaces processing step (S25) on the first covering portion and the second covering portion, after the second molding step. That is, the first edge surface of the first covering portion and the fourth edge surface of the second covering portion are processed into tapered inclined surfaces. In the temporary assembly step, the first edge surface and the second edge surface are brought into contact with each other, and the third edge surface and the fourth edge surface are brought into contact with each other. As a result, the first covering portion is less likely to be displaced relative to the third covering portion. Similarly, the second covering portion is less likely to be displaced relative to the third covering portion.

It is also possible to use the whole of the tubular body as the third covering portion. In this case, when the resin-impregnated reinforcing fiber (impregnated fiber) is wound around the first mold to obtain the tubular body, it is preferable that a thickness of the tubular body is reduced at longitudinal both end portions thereof, and the thickness of the tubular body is increased toward a longitudinal intermediate portion thereof. As a result, in the first molding step, the tubular body having the second edge surface and the third edge surface formed as tapered inclined surfaces is obtained.

Specifically, a lower layer (80) is formed by winding the impregnated fiber around the first mold, and then an upper layer (82) is laminated thereon. At this time, the winding start position of the upper layer is brought closer to the longitudinal intermediate portion than the winding start position of the lower layer. By repeating this operation, the thickness of the tubular body becomes smaller at longitudinal both end portions thereof, and the thickness of the tubular body becomes larger toward the longitudinal intermediate portion thereof.

Alternatively, a sheet body (84) whose dimension in the width direction orthogonal to the longitudinal direction is gradually reduced is used. In this case, in the first molding step, the sheet body is wound around the first mold with the longer side in the width direction as the front end. As the winding progresses, the end portion of the upper layer in the width direction becomes closer to the longitudinal intermediate portion of the tubular body than the end portion of the lower layer in the width direction. Accordingly, by repeating the winding, the thickness of the tubular body becomes smaller at longitudinal both end portions thereof, and the thickness of the tubular body becomes larger toward the longitudinal intermediate portion thereof.

In either case, the second and third edge surfaces processing step becomes unnecessary. It is preferable that the first edge surface of the first covering portion and the fourth edge surface of the second covering portion are formed as tapered inclined surfaces in accordance with the formation of the second edge surface and the third edge surface as tapered inclined surfaces. That is, a first and fourth edge surfaces processing step (S25) of processing the first edge surface and the fourth edge surface into tapered inclined surfaces is performed after the second molding step.

A specific example of a method for obtaining the tubular body includes a sheet winding method or a filament winding method.

It is preferable that, before insertion step is performed, a lubricant (102) is applied to the inner wall of the inner reinforcing layer (an application step is performed). Accordingly, the liner is prevented from adhering to the inner reinforcing layer. Therefore, in the case where the liner is made of a resin, the gas that has permeated through the liner can easily enter between the liner and the inner reinforcing layer. Further, in the liner molding step, the outer wall of the expanding hollow preform slides relative to the inner wall of the inner reinforcing layer. Therefore, the portion of the hollow preform that is in contact with the inner wall of the inner reinforcing layer can extend along the surface direction. Accordingly, it is possible for the hollow preform to further expand.

As a result, formation of the liner whose deformation is insufficient is avoided. That is, it is possible to prevent the liner from having different thicknesses depending on portions. In addition, the liner is prevented from having a distorted shape.

The present invention is not limited to the above-described embodiments, and various configurations can be adopted therein without departing from the essence and gist of the present invention.

For example, it is not particularly necessary to provide the second cap 242 in the second dome portion 20. In this case, the radially central portions of the second dome portion 20 and the second covering portion 46 are closed ends. In order to obtain the high-pressure vessel 10 having such a configuration, blow molding is performed using a hollow preform whose second end is a closed end.

Instead of attaching the first inner cap 261 (or the second inner cap 262) to the first outer cap 281 (or the second outer cap 282), it is also possible to attach a valve thereto.

What is claimed is:

1. A high-pressure vessel comprising a liner that is hollow, a reinforcing layer configured to cover the liner from outside, and a cap including a passage, wherein
the liner includes a body portion having a tubular shape, and a first dome portion and a second dome portion respectively connected to longitudinal both end portions of the body portion,
the reinforcing layer includes an inner reinforcing layer made of a fiber-reinforced resin and configured to cover the liner from outside, and an outer reinforcing layer made of the fiber-reinforced resin and configured to cover the inner reinforcing layer from outside,
the inner reinforcing layer includes a first covering portion configured to cover the first dome portion, a second covering portion configured to cover the second dome portion, and a third covering portion configured to cover the body portion,
a first edge surface of the first covering portion that faces the third covering portion and a second edge surface of the third covering portion that faces the first covering portion are brought into contact with each other, and a third edge surface of the third covering portion that faces the second covering portion and a fourth edge surface of the second covering portion that faces the third covering portion are brought into contact with each other,
the outer reinforcing layer covers the first covering portion, the third covering portion, and the second covering portion from outside,
at least one of the first dome portion or the second dome portion integrally includes a tubular portion extending from a radially central part of the at least one of the first dome portion or the second dome portion in a direction away from the body portion,
the cap is formed of a first member whose outer circumferential surface is in contact with an inner circumferential surface of the tubular portion and a second member whose inner circumferential surface is in contact with an outer circumferential surface of the tubular portion and whose outer circumferential surface is in contact with the inner reinforcing layer and the outer reinforcing layer,
the second member includes: a protruded portion protruding from the outer reinforcing layer; and a male thread formed on an outer circumferential surface of the protruded portion,
the first member includes: a main body inserted into an interior of the tubular portion; and a cap portion provided at an end of the main body,
a female thread is formed on the cap portion, and
the cap portion covers the protruded portion from outside and the female thread is screwed to the male thread.

2. The high-pressure vessel according to claim 1, wherein the first edge surface, the second edge surface, the third edge surface, and the fourth edge surface are tapered inclined surfaces.

3. The high-pressure vessel according to claim 1, wherein a lubricating layer is formed on an inner wall of the inner reinforcing layer, the inner wall facing the liner.

4. A high-pressure vessel comprising a liner that is hollow, a reinforcing layer configured to cover the liner from outside, and a first cap and a second cap each including a passage, wherein
the liner includes a body portion having a tubular shape, and a first dome portion and a second dome portion respectively connected to longitudinal both end portions of the body portion,
the reinforcing layer includes an inner reinforcing layer made of a fiber-reinforced resin and configured to cover the liner from outside, and an outer reinforcing layer made of the fiber-reinforced resin and configured to cover the inner reinforcing layer from outside,
the inner reinforcing layer includes a first covering portion configured to cover the first dome portion, a second covering portion configured to cover the second dome portion, and a third covering portion configured to cover the body portion,
a first edge surface of the first covering portion that faces the third covering portion and a second edge surface of the third covering portion that faces the first covering portion are brought into contact with each other, and a third edge surface of the third covering portion that faces the second covering portion and a fourth edge surface of the second covering portion that faces the third covering portion are brought into contact with each other, the outer reinforcing layer covers the first covering portion, the third covering portion, and the second covering portion from outside, the first dome portion integrally includes a first tubular portion extending from a radially central part of the first dome portion in a direction away from the body portion and the second dome portion integrally includes a second tubular portion extending from a radially central part of the second dome portion in a direction away from the body portion, the first cap is formed of a first member whose outer circumferential surface is in contact with a first inner circumferential surface of the first tubular portion and a second member whose inner circumferential surface is in contact with a first outer circumferential surface of the first tubular portion and whose outer circumferential surface is in contact with the inner reinforcing layer and the outer reinforcing layer, and the second cap is formed of a first member whose outer circumferential surface is in contact with a second inner circumferential surface of the second tubular portion and a second member whose inner circumferential surface is in contact with a second outer circumferential surface of the second tubular portion and whose outer circumferential surface is in contact with the inner reinforcing layer and the outer reinforcing layer, the second member includes: a protruded portion protruding from the outer reinforcing layer;

and a male thread formed on an outer circumferential surface of the protruded portion, the first member includes: a main body inserted into an interior of the tubular portion; and a cap portion provided at an end of the main body, a female thread is formed on the cap portion, and the cap portion covers the protruded portion from outside and the female thread is screwed to the male thread.

* * * * *